US006785219B1

(12) United States Patent
Sasaki et al.

(10) Patent No.: US 6,785,219 B1
(45) Date of Patent: Aug. 31, 2004

(54) INFORMATION RECORDING MEDIUM, INFORMATION RECORDING/ REPRODUCING METHOD, AND INFORMATION RECORDING/ REPRODUCING DEVICE

(75) Inventors: Miyuki Sasaki, Moriguchi (JP); Yoshiho Goto, Osaka (JP); Yoshihisa Fukushima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/926,126

(22) PCT Filed: Mar. 8, 2000

(86) PCT No.: PCT/JP00/01380

§ 371 (c)(1),
(2), (4) Date: Sep. 7, 2001

(87) PCT Pub. No.: WO00/54158

PCT Pub. Date: Sep. 14, 2000

(30) Foreign Application Priority Data

Mar. 10, 1999 (JP) ............................................. 11-62761

(51) Int. Cl.[7] ................................................ G11B 7/00
(52) U.S. Cl. .............................. 369/275.3; 369/47.15; 369/53.1; 369/59.1
(58) Field of Search ............................. 369/47.1, 47.15, 369/47.21, 53.1, 53.11, 53.2, 53.31, 53.37, 53.41, 54.44, 53.45, 59.1, 59.25, 275.1, 275.3

(56) References Cited

U.S. PATENT DOCUMENTS

| 5,347,651 | A | * | 9/1994 | Burke et al. ................. 707/205 |
| 5,832,522 | A | * | 11/1998 | Blickenstaff et al. ....... 707/204 |
| 5,907,672 | A | * | 5/1999 | Matze et al. .................... 714/8 |

FOREIGN PATENT DOCUMENTS

| JP | 9-139053 | 5/1997 |
| JP | 10-11345 | 1/1998 |

OTHER PUBLICATIONS

"ISO 9660—Information processing—Volume and file structure of CD–ROM for information interchange", International Organization for Standardization, Sep. 1998.
"ISO 9660—Information processing—Volume and file structure of CD–ROM for information interchange", 53 pages downloaded from the Internet on Dec. 14, 2001.
English language Abstract of JP 9–139053.
"DVD File System 'UDF Bridge' no Gaiyou" by Yoshiho Goto et al., National Technical Report, vol. 43, No. 3, published Jun. 18,1997.
English Language Abstract of JP 10–11345.
"CD–ROM no Tsukai Gatte wo Floppy nami ni takameru" by Tasuya Inokuchi, Nikkei Electronics, No. 670, published Sep. 9, 1996.

* cited by examiner

*Primary Examiner*—Muhammad Edun
(74) *Attorney, Agent, or Firm*—Greenblum & Bernstein, P.L.C.

(57) ABSTRACT

A lead-out area is recorded and a session is formed each time a file is recorded with the data structure of a disc recorded with the conventional CD-R multi-session method. The latest file structure recorded in the last session is read with a multi-session disc by reading in series the start address of the next session recorded in the lead-in area of each session. This information read in series is dependent upon the number of file write operations, and as the number of writes increases, the slower the latest file structure retrieval process becomes. In a write-once medium in which the file management information and unrecorded area information are update recorded at each recording session, chaining information is recorded at each file write. Furthermore, an area for recording a plurality of continuously recorded chaining information is reserved, and access in the latest chaining information retrieval process is accelerated. Furthermore, address information for an area contiguously reserved for chaining information is recorded in part of the chaining information.

27 Claims, 16 Drawing Sheets

INFORMATION RECORDING MEDIUM, INFORMATION RECORDING/REPRODUCING METHOD, AND INFORMATION RECORDING/REPRODUCING DEVICE

TECHNICAL FIELD

The present invention relates to a data storage medium to which files managed using a volume/file structure are recorded and reproduced, and in which the number of data recording operations to any same area is limited, and to a data recording and reproducing method and data recording and reproducing apparatus using this data storage medium. More particularly, the present invention relates to a data storage medium having a volume/file structure for retrieving the latest file management information, which is recorded continuously in the space in file addition units for managing file information and address information for unrecorded areas in the volume space and can be reproduced in series to make access faster, and relates to a data recording and reproducing method and a data recording and reproducing apparatus using this data storage medium.

BACKGROUND ART

While media of various types have been used in recent years for recording digital data, CD-R discs in particular have quickly become commonly used as a low-cost recordable optical disc medium. The multi-session method is now well known as a technique for writing data to these CD-R discs; a data recording operation using this multi-session method is described next below with reference to the accompanying figures.

FIG. 14 shows the data structure of a CD-R disc to which files managed using the volume/file structure defined in the ISO 9660 standard are recorded using a multi-session method. In a multi-session recording method, files and file structure and volume structure for managing files are recorded in session units. Each session has a lead-in area, an inner link area, a user data area, and a lead-out area. It is to be noted that only the first session does not have a lead-in area; an outer link area is formed between sessions.

When recording data by session unit, a file and file structure and volume structure for managing the file are first recorded to the user data area. In order to make data reproduction easier for a CD-ROM drive, which is unable to detect a location in a unrecorded area of a CD-R disc because it is unable to detect the wobble address recorded to the CD-R disc, data containing address information is also recorded to the lead-out area, and data containing start address information for the next session is recorded to a lead-in area, when the CD-R disc is removed from the CD-R drive. The user area, lead-in area, and lead-out area are each recorded in separate data recording operations. The data recorded in the data recording operation for each area is the recording data with a link block and run-in block, or a run-out block and link block, added therebefore and thereafter. An inner link area or an outer link area comprising a run-out block, link block, and run-in block is thus formed at the junction between these areas.

A multi-session data recording operation is described next below. FIG. 15 shows the directory structure used for managing files recorded to a CD-R disc. The directory structure shown in FIG. 15 has a subdirectory (Dir-A) for managing a data file (File-a), a subdirectory (Dir-B) for managing a data file (File-b), and a subdirectory (Dir-C) for managing a data file (File-c) below the root directory. When data file (File-a), data file (File-b), and data file (File-c) are recorded during a first session, second session, and third session in accordance with this directory structure, the data structure described above with reference to FIG. 14 is formed on the CD-R disc.

FIG. 16 is a flow chart describing a recording operation for creating a disc with the data structure shown in FIG. 15. The data recording operation performed each session is described next below according to the steps shown in this flow chart.

(S1601) When a CD-R disc is inserted into the disc recorder, the disc recorder accesses the lead-in area reserved at a specific location at the inside circumference of the disc, and attempts to read the TOC data from this lead-in area. If the TOC data is reproduced from the lead-in area, a step (S1602) for retrieving the following session data is performed. However, if the data could not be reproduced because the lead-in area is unrecorded, the session data recording operation is performed according to the procedure beginning in step (S1603).

(S1602) If the TOC data is reproduced from the lead-in area, the disc recorder reads the start address of the following session contained in this TOC data, returns to step (S1601), and then tries to reproduce data from the lead-in area of the following session.

(S1603) When a lead-in area to which no data is recorded is detected, the file recorded as the session data and the file structure and volume structure for managing said file are generated as follow.

First, when data is not reproduced from the first lead-in area, the data file (File-a) to be recorded as the data for the first session, subdirectory (Dir-A) for managing data file (File-a) and a directory file for managing the root directory, and volume/file structure, such as a primary volume descriptor and path table, for managing these files and the directory file, are generated according to the ISO 9660 standard.

If TOC data is reproduced from the first lead-in area, the volume/file structure and directory file are read using the user data area start address contained in the last read TOC data. For example, with a disc to which only a first session has been recorded, data is read from user data area 1402; with a disc that has been recorded through a second session, data is read from user data area 1405. The content of the volume/file structure is then updated by adding the file to be recorded and a directory file for managing said file to the read data. For example, a new volume/file structure is generated data by adding file (File-b) and the directory file (Dir-B) of the subdirectory for managing data file (File-b) to the data read from user data area 1402 on a disc to which only a first session has been recorded; and by adding data file (File-c) and the directory file (Dir-C) of the subdirectory for managing data file (File-c) to the data read from user data area 1405 on a disc to which a second session has also been recorded.

(S1604) When the volume/file structure to be recorded to a user data area is generated, a lead-in area and run-out block of predetermined recording size are skipped, and the recording data generated in step (S1603) to which a predefined link block/run-in block and link block/run-out block have been added therebefore and thereafter is continuously recorded.

(S1605) When data recording to the user data area is completed, recording data having a predefined link block/run-in block and link block/run-out block added before and after the data recorded to the lead-out area is generated. The resulting recording data is then recorded continuously from the link block following the run-out block recorded in step (S1604). When recording the first session, for example, this operation records lead-out area 1403 and the link block/run-in block and run-out block/link block located therebefore and thereafter. When recording a second session, this operation records lead-out area 1406 and the link block/run-in block and run-out block/link block located therebefore and thereafter.

(S1606) When data recording to the lead-out area is completed, the start address of the next session is calculated with consideration for the predetermined recording size of the outer link area. The calculated start address of the next session is then embedded in the TOC data recorded to the lead-in area together with the start address for the user data area recorded in step (S1604).

Recording data comprising predefined link block/run-in block and run-out block/link block units before and after the recording data for the lead-in area is then generated. The resulting recording data is then recorded continuously from a specific position at the inside circumference of the disc if the first session is being recorded. As a result of this recording operation, lead-in area 1401 and the run-out block/link block located immediately thereafter are recorded in the recording operation for a first session, for example. In a recording operation for a second session, the lead-in area 1404 and the link block/run-in block and run-out block/link block units positioned therebefore and thereafter are recorded, and the data recording operation ends.

The data recording operation described above forms a multi-session data structure such as shown in FIG. 14 on the disc. A logical sector number (LSN) is assigned to each sector in the data structure shown in FIG. 14 with the first sector in the user data area in the first session designated 0, and the logical sector number rising continuously at each successive sector. The volume space is defined as the area beginning from the sector at LSN 0.

The operation whereby a data file (File-a) is reproduced from the first session of a disc having a data structure as shown in FIG. 14 is described next below with reference to FIG. 14 and FIG. 16.

When a CD-R disc is inserted to a disc reader, the disc reader follows the procedure shown in steps (S1601) to (S1603) in the flow chart in FIG. 16 to read the latest volume/file structure 1420 from the user data area of the third session. If a CD-ROM drive is connected to a computer system, the host computer obtains the start address for the user data area of the third session to which the latest volume/file structure is recorded by executing a READ TOC command. Using this start address, it then calculates the LSN of the sector to which the latest volume/file structure is recorded, and reads this structure from the disc.

Next, when the latest volume/file structure 1420 is read, the structure is interpreted according to the ISO 9660 standard using the primary volume descriptor 1421, path table 1422, root directory 1423, and directory file (Dir-A) 1424 for managing data file (File-a) 1425. The recording position of the data file is then read from the directory record of the data file (File-a) 1425 contained in directory file (Dir-A) 1424.

The data file (File-a) 1425 recorded to the user data area of the first session is then reproduced based on said data file recording position.

DISCLOSURE OF INVENTION

Technical Problem to be Solved by the Invention

With the multi-session method as described above, a lead-out area must be recorded to form a session each time a file is recorded.

Furthermore, with the data structure of a disc recorded using this multi-session method, the latest file structure recorded to the last session is read by reading in series the address information of the following session from the lead-in area of each session, starting from the address information of the next session recorded to the lead-in area of the first session.

In addition, this address information reading operation must be accomplished by running a READ TOC command or other special command instead of using the standard READ command used for reproducing files from the volume space. The present invention solves the above-noted problem, and has as an object enabling writing in file units without requiring a finalizing process such as recording a lead-out area each time a file is written, and enabling the latest file structure to be read at high speed using a standard READ command.

Method of Solving the Problem

The above noted object is achieved by a data structure such as that of a data storage medium in which a file managed using a volume/file structure is recorded and reproduced from one end of a data recording area, and in which a number of data recording operations to a same area is limited, wherein the data storage medium is characterized by an area for continuously recording a plurality of chaining information areas to which is recorded chaining information containing root directory file management information having location information for a next root directory file allocated for update recording, and unallocated area management information having location information for a next unrecorded area.

The above noted object is achieved by a processing sequence such as that of a data recording method for applying a formatting process to a data storage medium in which a file managed using a volume/file structure is recorded and reproduced from one end of a data recording area, and in which a number of data recording operations to a same area is limited, the data recording method characterized by a volume structure recording step for recording volume structure; an open integrity information recording step for recording open integrity information indicating a formatting process start status; an unallocated chaining information area address calculation and registration step for calculating and registering in chaining information an address of an unallocated chaining information area that is an unallocated area in an area where chaining information is continuously recorded; a root directory file recording step for recording a root directory file; and a chaining information recording step for recording chaining information.

The above noted object is achieved by a processing means such as that of a data recording apparatus for applying a formatting process to a data storage medium in which a file managed using a volume/file structure is recorded and reproduced from one end of a data recording area, and in which a number of data recording operations to a same area is limited, the data recording apparatus characterized by a volume structure recording means for recording volume structure; an open integrity information recording means for recording open integrity information indicating a formatting process start status; an address calculation and registration means for calculating and registering in chaining information an address of an unallocated chaining information area that is an unallocated area in an area where chaining information is continuously recorded; a file structure recording means for recording a root directory file; and a chaining information recording means for recording chaining information.

The above noted object is achieved by a processing sequence such as that of a data recording method for recording a file to a data storage medium in which a file managed using a volume/file structure is recorded and reproduced from one end of a data recording area, and in which a number of data recording operations to a same area is limited, the data recording method characterized by a volume structure reproducing step for reading volume structure recorded in a formatting process; a chaining information reproducing step for reading the latest chaining information while reading in series completely recorded chaining information according to previously read volume structure content; a file structure reproducing step for reading a file structure; a file recording step for accomplishing data file recording; a file structure recording step for accomplishing file structure recording; an address calculation and registration step for calculating and registering in chaining information an address of an unallocated chaining information area that is an unallocated area in an area where a plurality of chaining information is continuously recorded; and a chaining information recording step for recording chaining information.

The above noted object is achieved by a processing means such as that of a data recording apparatus for recording a file to a data storage medium in which a file managed using a volume/file structure is recorded and reproduced from one end of a data recording area, and in which a number of data recording operations to a same area is limited, the data recording apparatus characterized by a volume structure reproducing means for reading volume structure recorded in a formatting process; a chaining information reproducing means for reading the latest chaining information while reading in series completely recorded chaining information according to previously read volume structure content; a file structure reproducing means for reading a file structure; a file recording means for accomplishing data file recording; a file structure recording means for accomplishing file structure recording; an address calculation and registration means for calculating and registering in chaining information an address of an unallocated chaining information area that is an unallocated area in an area where a plurality of chaining information is continuously recorded; and a chaining information recording for recording chaining information.

The above noted object is achieved by a processing sequence such as that of a data recording method for applying a closing process, for preventing a performance drop resulting from wrong access to an unrecorded area, to a data storage medium in which a file managed using a volume/file structure is recorded and reproduced from one end of a data recording area, and in which a number of data recording operations to a same area is limited, the data recording method characterized by a volume structure reproducing step for reading volume structure recorded in a formatting process; an integrity information reproducing step for reading the latest integrity information while reading in series completely recorded close integrity information and open integrity information according to previously read volume structure content; a chaining information reproducing step for reading the latest chaining information while reading in series completely recorded chaining information according to previously read volume structure content; a file structure reproducing step for reading a file structure using the read chaining information; an unallocated chaining information area address calculation and registration step for calculating and registering in chaining information an address of an unallocated chaining information area that is an unallocated area in an area where chaining information is continuously recorded; a chaining information recording step for recording chaining information; an overrun extent recording step for recording an overrun extent for preventing wrong access to an unrecorded area in a file structure and file reproducing operation; and a close integrity information recording step for recording close integrity information indicative of recording completion.

The above noted object is achieved by a processing means such as that of a data recording apparatus for applying a closing process, for preventing a performance drop resulting from wrong access to an unrecorded area, to a data storage medium in which a file managed using a volume/file structure is recorded and reproduced from one end of a data recording area, and in which a number of data recording operations to a same area is limited, the data recording apparatus characterized by a volume structure reproducing means for reading volume structure recorded in a formatting process; an integrity information reproducing means for reading the latest integrity information while reading in series completely recorded close integrity information and open integrity information according to previously read volume structure content; a chaining information reproducing means for reading the latest chaining information while reading in series completely recorded chaining information according to previously read volume structure content; a file structure reproducing means for reading a file structure using the read chaining information; an unallocated chaining information area address calculation and registration means for calculating and registering in chaining information an address of an unallocated chaining information area that is an unallocated area in an area where chaining information is continuously recorded; a chaining information recording means for recording chaining information; an overrun extent recording means for recording an overrun extent for preventing wrong access to an unrecorded area in a file structure and file reproducing operation; and a close integrity information recording means for recording close integrity information indicative of recording completion.

The above noted object is achieved by a processing sequence such as that of a data recording method for applying a opening process for beginning recording data to a data storage medium in which a file managed using a volume/file structure is recorded and reproduced from one end of a data recording area, and in which a number of data recording operations to a same area is limited, the data recording method characterized by a volume structure reproducing step for reading volume structure recorded in a formatting process; an integrity information reproducing step for reading the latest integrity information while reading in series completely recorded close integrity information and open integrity information according to previously read volume structure content; a chaining information reproducing step for reading the latest chaining information while reading in series completely recorded chaining information according to previously read volume structure content; an open integrity information recording step for recording open integrity information; and an unallocated chaining information area address calculation and registration step for calculating and registering in chaining information an address of an unallocated chaining information area that is an unallocated area in an area where chaining information is continuously recorded.

The above noted object is achieved by a processing means such as that of a data recording apparatus for applying a closing process, for preventing a performance drop resulting from wrong access to an unrecorded area, to a data storage medium in which a file managed using a volume/file structure is recorded and reproduced from one end of a data recording area, and in which a number of data recording operations to a same area is limited, the data recording apparatus characterized by a volume structure reproducing means for reading volume structure recorded in a formatting process; an integrity information reproducing means for reading the latest integrity information while reading in series completely recorded close integrity information and open integrity information according to previously read volume structure content; a chaining information reproducing means for reading the latest chaining information while reading in series completely recorded chaining information according to previously read volume structure content; an open integrity information recording means for recording open integrity information; and an unallocated chaining information area address calculation and registration means for calculating and registering in chaining information an address of an unallocated chaining information area that is an unallocated area in an area where chaining information is continuously recorded.

The above noted object is achieved by a processing sequence such as that of a data reproducing method for reproducing a file from a data storage medium to which a volume/file structure is recorded by a formatting process and to which a number of data recording operations to a same area is limited, the data reproducing method characterized by a volume structure reproducing step for reading volume structure recorded in a formatting process; a chaining information reproducing step for reading the latest chaining information while reading in series a plurality of continuously recorded chaining information according to previously read volume structure content; a file structure reproducing step for reading file structure using the read chaining information; and a file reproducing step for retrieving and reading a file using the read file structure.

The above noted object is achieved by a processing means such as that of a data reproducing apparatus for reproducing a file from a data storage medium to which a volume/file structure is recorded by a formatting process and to which a number of data recording operations to a same area is limited, the data reproducing apparatus characterized by a volume structure reproducing means for reading volume structure recorded in a formatting process; a chaining information reproducing means for reading the latest chaining information while reading in series a plurality of continuously recorded chaining information according to previously read volume structure content; a file structure reproducing means for reading file structure using the read chaining information; and a file reproducing means for retrieving and reading a file using the read file structure Improvement Over the Prior Art Chaining information storing management information for accessing a newly recorded data file and start address information for an unrecorded data area in the volume space is recorded each time a file is written to a data storage medium according to the present invention. This makes it possible to write data by file unit without accomplishing a finalizing process such as recording a lead-out area.

High speed access is also made possible by multiply recording chaining information to a plurality of contiguous areas so that the chaining information can be read in series from successively recorded areas.

BEST MODE FOR CARRYING OUT THE INVENTION

With a data storage medium according to the present invention, chaining information storing the address of management information for retrieving the latest file structure and a unrecorded disc area is recorded in the volume space, and multiple chaining information are recorded continuously. It is therefore possible for operations for recording or reproducing new data files or file structure for managing data files to reproduce the latest file structure or retrieve an area for recording new data at high speed using this chaining information recorded multiple consecutive times in the volume space.

A data storage medium according to the present invention also stores address information for unallocated chaining information areas that are unallocated and unrecorded parts of the recordable chaining information area where said chaining information is continuously sequentially recorded. It is therefore possible for a disc recorder other than the disc recorder that recorded a file to continue recording and reproducing files to the same disc.

The preferred embodiments of the present invention are described next below with reference to the accompanying figures.

Embodiment 1

A data recording and reproducing apparatus for recording and reproducing files managed using a volume/file structure conforming to the ISO 13346 standard using a data storage medium, such as a CD-R disc or CD-RW disc, in which the number of data recording operations to a same disc area is limited, and the data structure of this data storage medium, are described below with reference to the accompanying figures as a preferred embodiment of the present invention.

Figure 1:
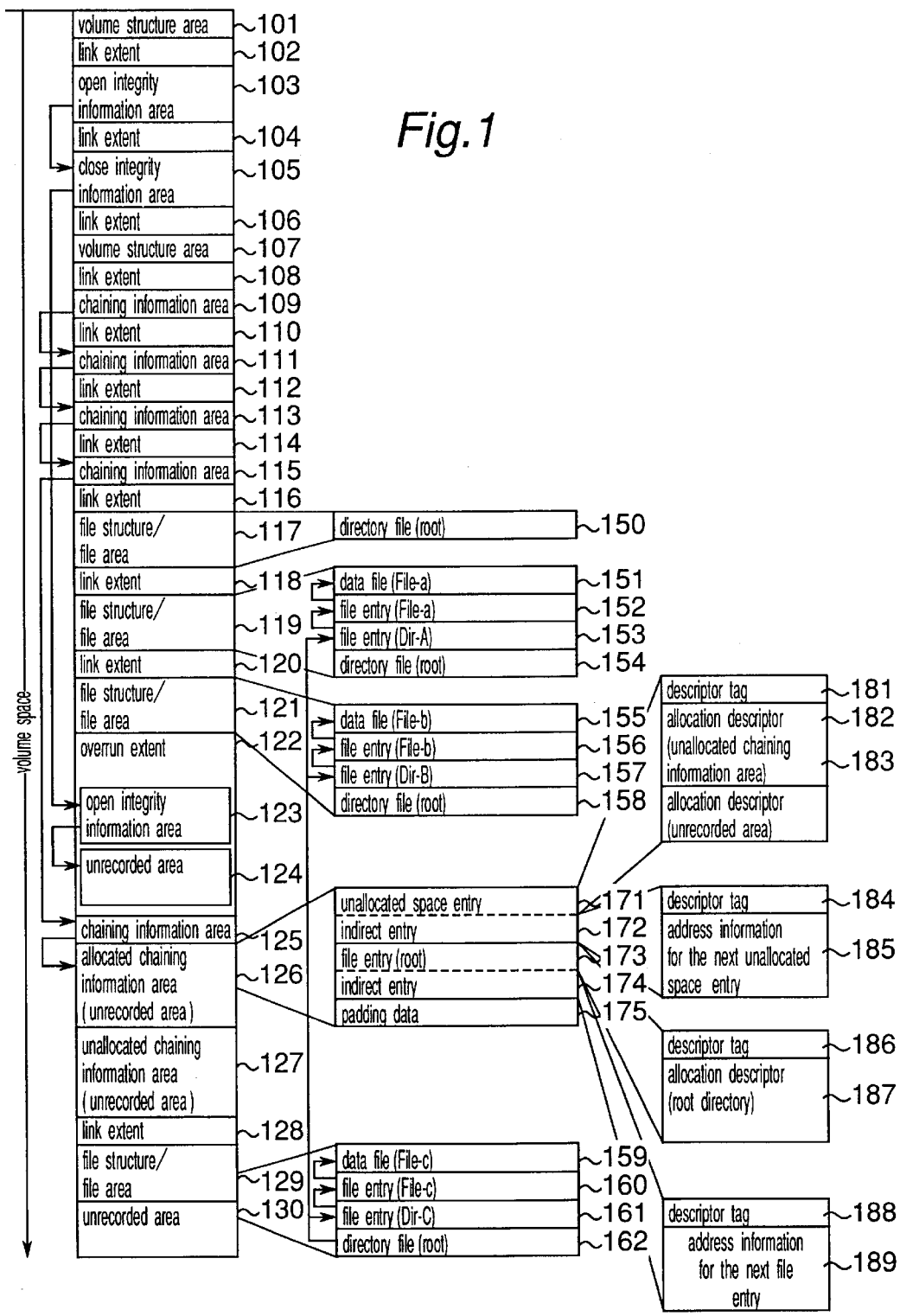
FIG. 1 is a data structure diagram showing the area structure in a data storage medium according to a first embodiment of the present invention.

FIG. 1 is a data structure diagram showing the area structure of a data storage medium according to this preferred embodiment of the invention when a root directory file file entry and unallocated space entry are used as part of the chaining information. As shown in FIG. 1, starting from volume structure area 101 to which the volume structure is recorded, open integrity information area 103, volume structure area 107, chaining information area 109, and file structure/file area 117 are formed in the volume space with link extents 102, 106, 108, and 116 disposed therebetween.

Figure 15:
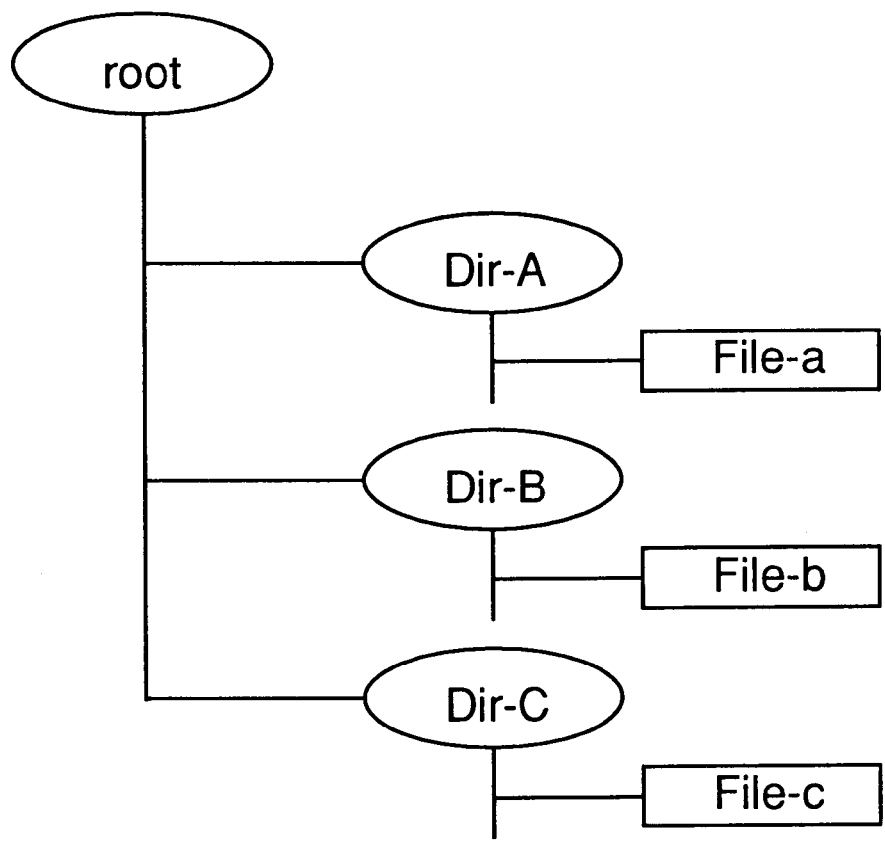
FIG. 15 is a diagram of a directory structure for managing files on disc.
Figure 16:
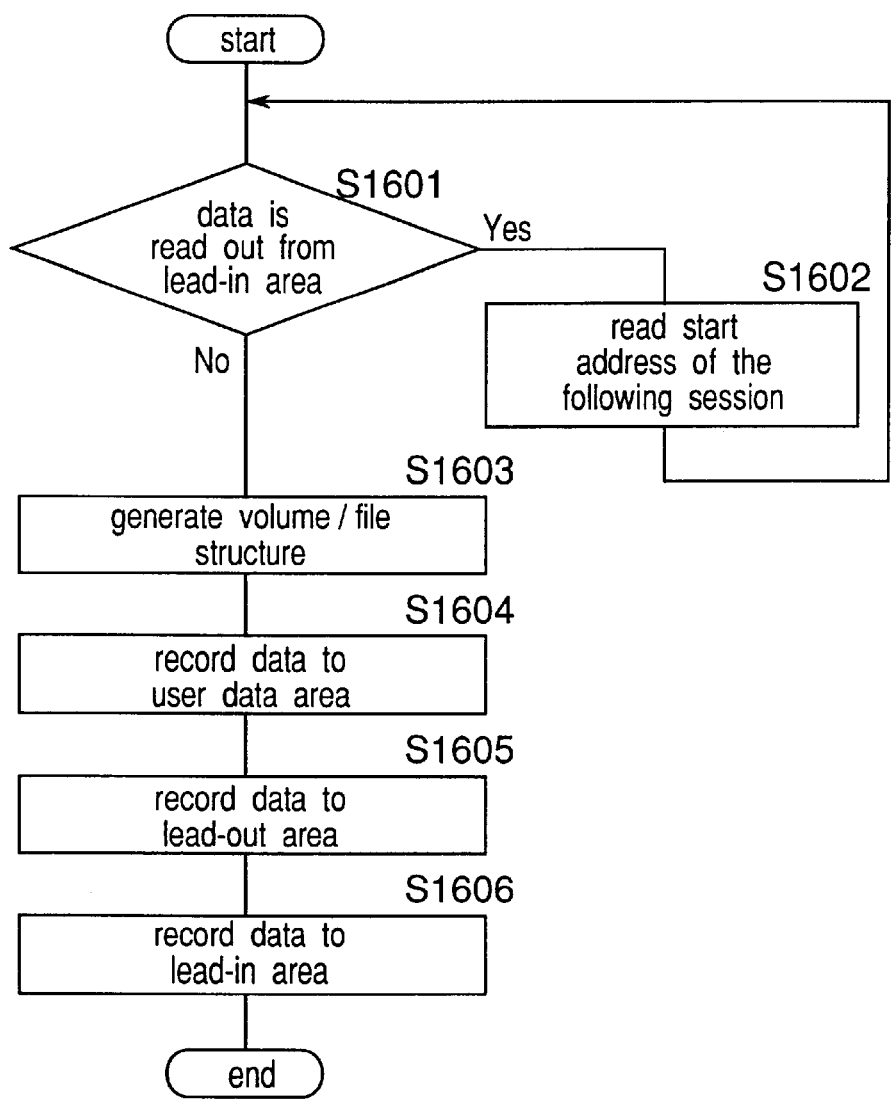
FIG. 16 is a flow chart of a conventional multi-session data recording operation.

To record data file (File-a) under the directory structure shown in FIG. 15, a file structure/file containing data file (File-a) is first recorded to file structure/file area 119 sandwiching link extent 118. Next, chaining information area 111 is recorded sandwiching link extent 110, completing one file recording operation.

When a data file (File-b) is then recorded according to the directory structure shown in FIG. 15, file structure/file area 121 containing data file (File-b) is recorded sandwiching link extent 120, and chaining information area 113 is recorded sandwiching link extent 112.

In the closing process accomplished so that this data structure will be readable by a read-only disc drive without a unrecorded area detection capability, chaining information area 115 in chaining information recording area 11 is then recorded sandwiching link extent 114, and overrun extent 122 is recorded with part left unrecorded. Finally, close integrity information area 105 is recorded sandwiching link extent 104.

In a opening process for again starting recording to a disc to which the closing process has been applied, open integrity information area 123 is recorded in the overrun extent.

To then record data file (File-c) under the directory structure shown in FIG. 15, file structure/file area 129 containing data file (File-c) is recorded sandwiching link extent 128, and chaining information area 125 is recorded.

It should be noted that while the outline of the data structure of a data storage medium shown in FIG. 1 has been described here, a more detailed data structure will be further described below in conjunction with the data recording process.

It should be noted that the areas left unrecorded in the data structure resulting from the above-described process are: unrecorded area 124 to which close integrity information is recorded; allocated chaining information area (unrecorded) 126 to which the next chaining information is allocated by the chaining information recorded to chaining information area 125; unallocated chaining information area (unrecorded) 127, which is reserved for chaining information but as yet unallocated; and unrecorded area 130.

Figure 2:
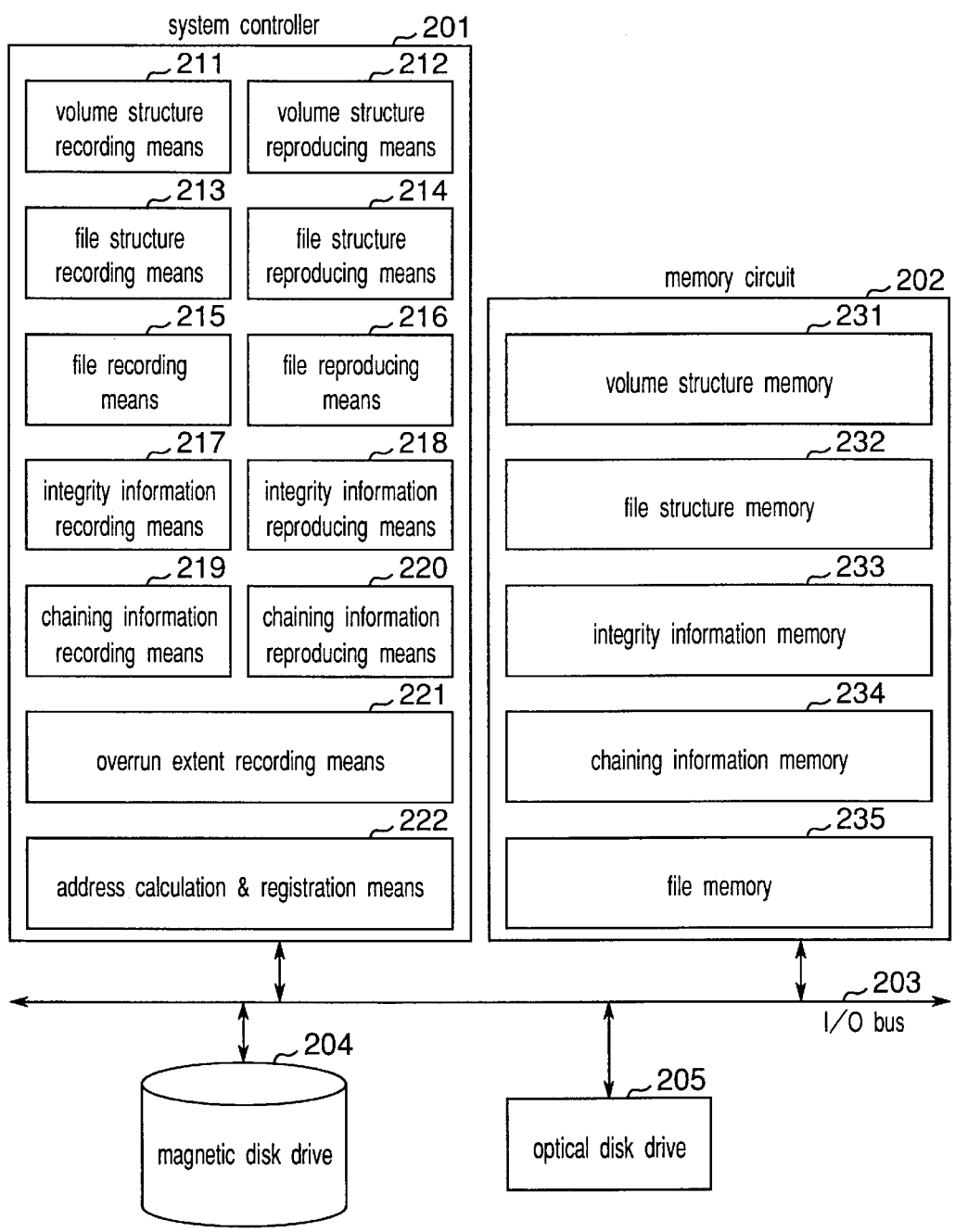
FIG. 2 is a block diagram of a data recording and reproducing apparatus according to a preferred embodiment of the present invention.

FIG. 2 is a block diagram of a data recording and reproducing apparatus according to a preferred embodiment of the present invention. As shown in FIG. 2, this data recording and reproducing apparatus comprises a system controller 201, memory circuit 202, I/O bus 203, magnetic disc drive 204, and optical disc drive 205.

The system controller 201, which is achieved with a control program and a microprocessor containing operating memory, comprises: volume structure recording means 211 for recording volume structure; a volume structure reproducing means 212 for reproducing the volume structure; a file structure recording means 213 for recording file structure; a file structure reproducing means 214 for reproducing file structure; a file recording means 215 for recording file data; a file reproducing means 216 for reproducing file data; a integrity information recording means 217 for recording integrity information; a integrity information reproducing means 218 for reproducing integrity information; chaining information recording means 219 for recording chaining information; chaining information reproducing means 220 for reproducing chaining information; overrun extent recording means 221 for recording an overrun extent; and address calculation and registration means 222 for calculating an address and registering location information as an allocation descriptor.

The memory circuit 202 comprises volume structure memory 231 used for calculating and temporarily storing volume structure; file structure memory 232 used for calculating and temporarily storing file structure integrity information memory 233 used for calculating and temporarily storing integrity information; chaining information memory 234 used for calculating and temporarily storing chaining information; and file memory 235 for temporarily storing a data file.

Figure 3:
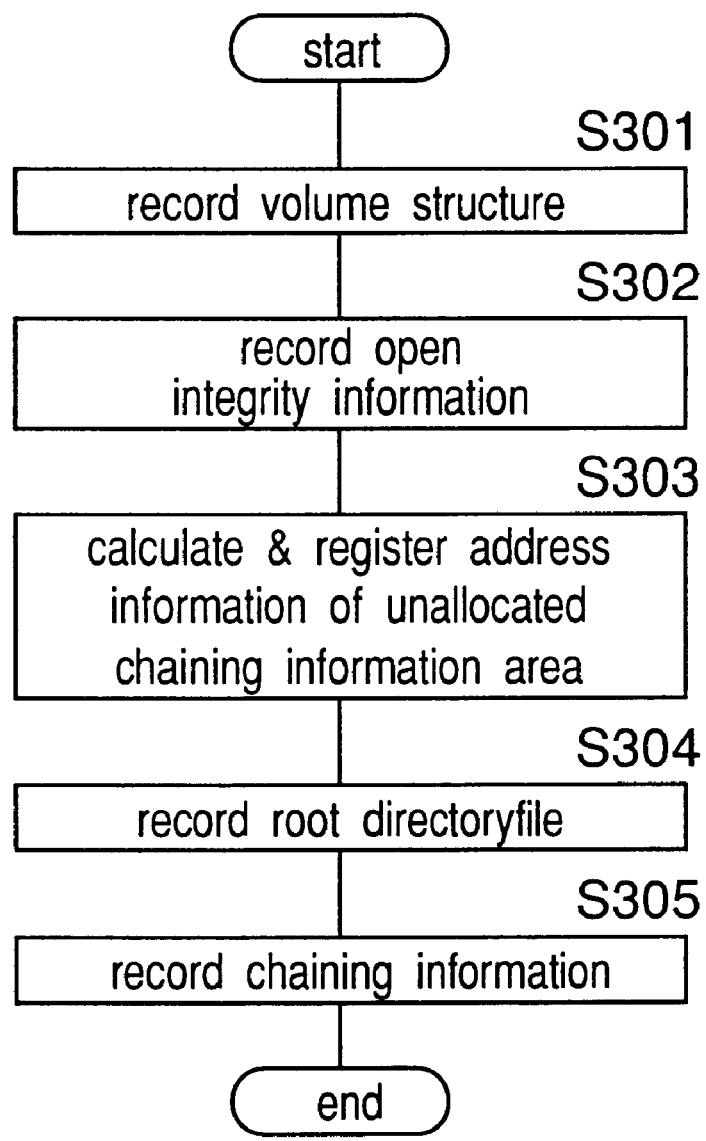
FIG. 3 is a flow chart describing a formatting process of a data recording and reproducing apparatus according to the present invention.

The formatting procedure for a data storage medium according to the present invention is described next below with reference to the block diagram in FIG. 2, the flow chart of the formatting process in FIG. 3, and a diagram of the data structure resulting from this formatting process shown in FIG. 4.

(S301) Following a control program stored internally as volume structure recording means 211, the system controller 201 generates volume structure containing a volume name and other predefined parameters in the volume structure memory 231 of memory circuit 202. The system controller 201 then instructs the optical disc drive 205 to record the volume structure generated in volume structure memory 231 according to this control program. The optical disc drive 205 internally generates recording data using this volume structure transferred from the volume structure memory 231 that skips and leaves unrecorded the areas to which open integrity information and close integrity information are to be recorded, and has a predefined link block/run-in block and link block/run-out block added before and after the data to be recorded before the skip and after the skip, and records continuously from the link block of link extent 106. When volume structure recording is completed, the optical disc drive 205 notifies the system controller 201 that recording has ended.

It should be noted that the link block/run-in block added to the volume structure before the skip is considered recorded outside the volume space and not shown in the present embodiment.

(S302) Next, following a program stored internally as the integrity information recording means 217, the system controller 201 generates open integrity information in the integrity information memory 233 of memory circuit 202. Further following this control program, the system controller 201 internally generates recording data having a predefined link block/run-in block and link block/run-out block added before and after the open integrity information generated by the optical disc drive 205 in the integrity information memory 233, and records continuously from the link block at the location of the specified recording start address.

This operation results in data being recorded twice to at least part of the link block because the above-noted volume structure recording operation and this open integrity information recording operation overlap at the link block. This method of recording data bracketing a link area can be achieved using the control procedure as described above with reference to the related art.

When volume structure recording is completed, the optical disc drive 205 notifies the system controller 201 that recording has ended.

(S303) Following a control program stored internally as address calculation and registration means 222, the system controller 201 next calculates the location of unrecorded area 418 and unallocated chaining information area (unrecorded area) 417 based on the number and length of chaining information recorded to continuous areas matching the number of file recording operations, and registers this to chaining information memory 234 of memory circuit 202. Registers to part of chaining information. The detailed data structure of this registered address information is further described below in conjunction with the chaining information. In this preferred embodiment of the invention, chaining information area 109 recorded during the formatting process, chaining information areas 111 and 113 recorded during file recording, and chaining information area 115 recorded during the closing process, are recorded with link extents 110, 112, and 114 therebetween to a contiguous area that is reserved according to the number of file recording operations for recording chaining information.

(S304) Following a control program stored internally as file structure recording means 213, the system controller 201 next generates a root directory file in file structure memory 232 of memory circuit 202. Then, following this control program, the system controller 201 instructs the optical disc drive 205 to record the root directory file generated in the file structure memory 232. In this recording operation command the system controller 201 specifies the start address of the recording area for the root directory file, that is, the file structure.

As in the recording operation for the volume structure, the optical disc drive 205 internally generates recording data having a predefined link block/run-in block and run-out block/link block added before and after the root directory file transferred from the file structure memory 232, and records the recording data continuously from the link block at the specified recording start address. When recording the root directory file is completed, the optical disc drive 205 notifies the system controller 201 that recording has ended.

(S305) Following a control program stored internally as chaining information recording means 219, the system controller 201 generates chaining information in the chaining information memory 234 of memory circuit 202. This chaining information has an information control block (ICB) structure according to the ISO 13346 standard, and in this preferred embodiment of the invention comprises an ICB for managing a root directory file, ICB for managing unallocated space, and padding data.

A root directory file ICB contains a file entry for managing a root directory file, and an indirect entry with address information for a following file entry. The unallocated space ICB likewise comprises an unallocated space entry for managing unallocated space, and an indirect entry with address information for a following unallocated space entry. In addition to the address information of unrecorded area 419, the address information to unallocated chaining information area (unrecorded area) 417 calculated in step (S303) is also registered in the unallocated space entry that is part of the chaining information. The detailed data structure of this chaining information is further described below.

It should be noted that the address information to allocated chaining information area (unrecorded area) 416 is recorded to the indirect entry 412 of the unallocated space entry of chaining information area 109, and the indirect entry 414 of the file entry for the root directory.

It should be noted that the order of the chaining information is not specifically limited. Furthermore, the padding data is dummy data for filling the remaining part of an ECC block.

Moreover, the system controller 201 continues and instructs the optical disc drive 205 according to this control program to record the chaining information generated in chaining information memory 234.

The system controller 201 specifies the start address of the area for recording the chaining information in this recording command with consideration for the recording position of the previously recorded volume structure area 107 and link extent 108. The optical disc drive 205 internally generates recording data having a predefined link block/run-in block and link block/run-out block added before and after the chaining information transferred from the chaining information memory 234, and records the recording data continuously from the link block of link extent 108. When recording the chaining information is completed, the optical disc drive 205 notifies the system controller 201 that recording has ended.

Figure 4:
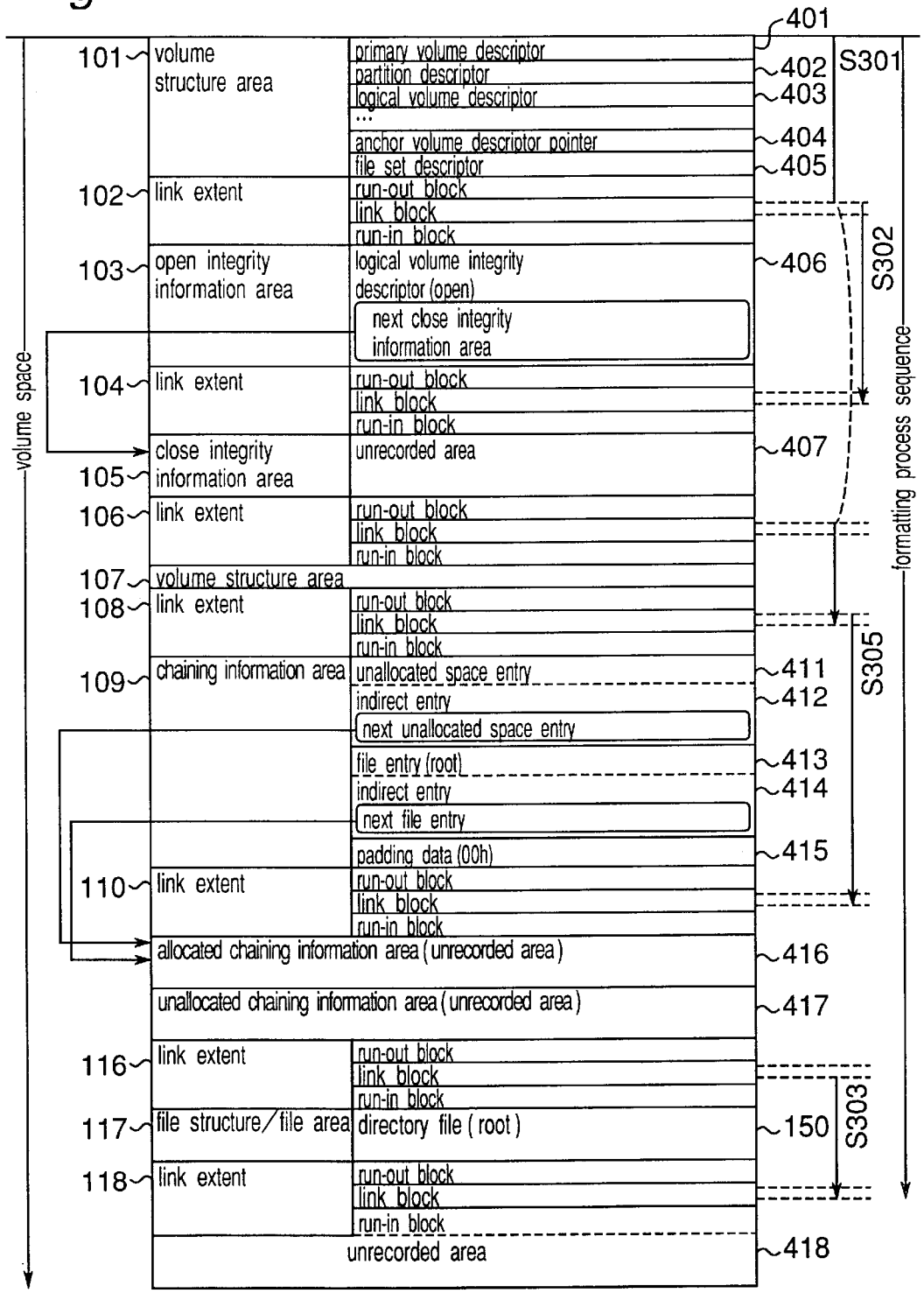
FIG. 4 is a data structure diagram of a formatted data storage medium.

When the above-described formatting process is accomplished, a data structure as shown in FIG. 4 is formed on the data storage medium. It should be noted that the arrows (S301) to (S305) added to FIG. 4 indicate the area recorded in each step shown in FIG. 3.

It should be noted that the volume structure areas 101 and 107, open integrity information area 103, chaining information area 109, and file structure/file area 117 have been described in the above formatting process as being separately recorded in conformance to the command unit processing sequence of a computer system. However, if a dedicated recording device that is not dependent upon the architecture of a computer system is used, it is also possible to format the disc by continuously recording volume structure areas 101 and 107, open integrity information area 103, chaining information area 109, and file structure/file area 117 while skipping the unrecorded areas. When a simplified formatting process such as this is accomplished, link extents 102 and 108 shown in FIG. 4 are not present.

In addition, a primary volume descriptor 401 containing volume attribute information, partition descriptor 402 containing partition information, logical volume descriptor 403 containing information for identifying logical volumes, anchor volume descriptor 404 that becomes a anchor point for disc access, and file set descriptor 405 containing file set information and address information for the root directory file file entry, are recorded as volume structure in the present embodiment. It should be noted that this volume structure shall not be limited to this order or type.

It should be noted that in ISO 13346 the file set descriptor is defined as part of the file structure, but in the data structure shown in FIG. 4 after the formatting process according to this preferred embodiment, the file set descriptor 405 is recorded in the volume structure area 101 as part of the volume structure to simplify the description of operation.

Figure 5:
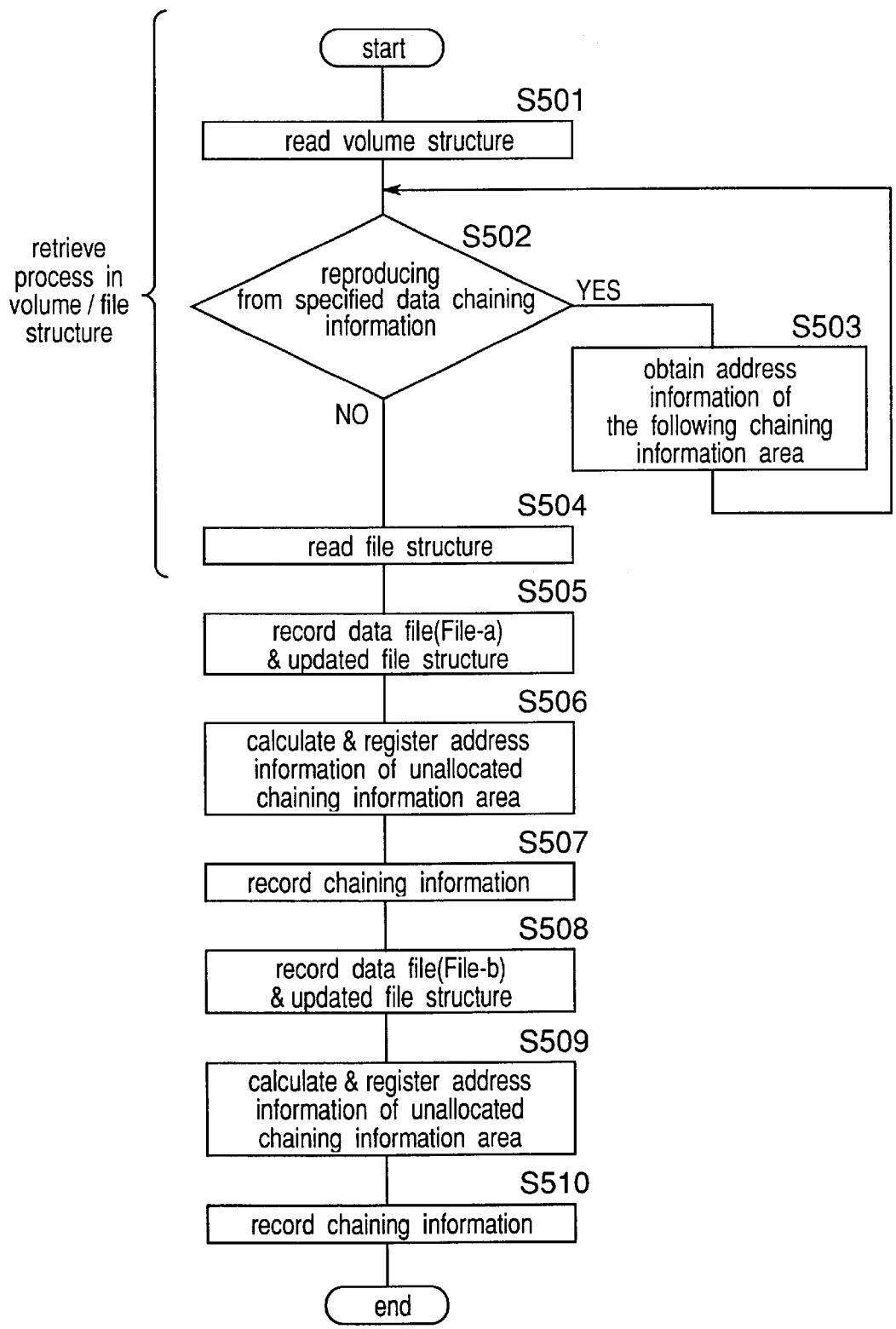
FIG. 5 is a flow chart describing a file recording process of a data recording and reproducing apparatus according to the present invention.

A control procedure for a process for recording files to a data storage medium as an embodiment of the present invention is described next with reference to the block diagram in FIG. 2, the data structure after the formatting process as shown in FIG. 4, the flow chart of this file recording process shown in FIG. 5, and the diagram shown in FIG. 6 of the data structure after file recording. It should be noted that in this file recording process data file (File-a) and data file (File-b) stored to magnetic disc drive 204 are described below as being separately recorded according to the directory structure shown in FIG. 15.

(S501) Following a control program stored internally as volume structure reproducing means 212, the system controller 201 instructs the optical disc drive 205 to read the volume structure recorded to an area having a specific logical sector number. The optical disc drive 205 accesses the specified area of the inserted disc (not shown in the figure), reads the volume structure, and transfers the read volume structure to the volume structure memory 231 of memory circuit 202. Next, the system controller 201 interprets the content of the primary volume descriptor 401, partition descriptor 402, logical volume descriptor 403, and file set descriptor 405 in order from the anchor volume descriptor 404 from in the read volume structure, and obtains address information for the volume information and logical volume integrity descriptor 406, unallocated space entry 411, that is, chaining information, and file entry 413 for the root directory file.

In the present embodiment, address information for the root directory file file entry that is part of the chaining information recorded first during the formatting process is specified in the logical volume descriptor 403, and address information for an unallocated space entry is specified in the partition descriptor 402. In addition, address information for the logical volume integrity descriptor (open) 406, that is, the first-recorded open integrity information, is specified by the logical volume descriptor 403. It should be noted that the order of the chaining information shall not be specifically limited. It should be noted that in the present embodiment a volume structure area 107 is recorded as a reserve volume structure area 101 so that when volume structure area 101 cannot be reproduced, reproduction is possible from volume structure area 107.

(S502) Following a control program stored internally as chaining information reproducing means 220, system controller 201 commands a read operation from the following chaining information area using the address information obtained in step (S501) or step (S503) described below. The optical disc drive 205 accesses the specified chaining information area and attempts data reproduction.

If data is reproduced from the specified chaining information area, the optical disc drive 205 transfers the reproduced information to the chaining information memory 234 of memory circuit 202. At this time system controller 201 accomplishes step (S503) to retrieve the updated chaining information area.

However, if data cannot be reproduced because the specified chaining information area is unrecorded, the system controller 201 determines that the last reproduced chaining information area is the latest, and proceeds from step (S504). For example, in a data storage medium having a data structure as shown in FIG. 4 after the formatting process, the information read from chaining information area 109 is the latest chaining information, and unallocated space entry 411 contained therein is used for managing unrecorded area 418 and unallocated chaining information area (unrecorded area) 417, while file entry (root) 413 is used for managing root directory file 150. Furthermore, in a data storage medium having a data structure as shown in FIG. 6 after the file recording process, the information read from chaining information area 113 is the latest chaining information, and unallocated space entry 611 contained therein is used for managing unrecorded area 622 while root directory file file entry 613 is used for managing root directory file 158. In other words, the address information for the unrecorded area recorded to the latest unallocated space entry, and the address information for the root directory file recorded in the file entry for the latest root directory file, are obtained here.

It should be noted that the information recorded as the chaining information shall not be limited to the unallocated space entry and root directory file file entry.

(S503) Following a control program stored internally as chaining information reproducing means 220, system controller 201 obtains address information for each ICB recording area of the next chaining information from the indirect entry of each ICB contained in the chaining information read in step (S502). In the present embodiment, address information for the following unallocated space entry is obtained from an indirect entry of the unallocated space entry, and address information for the next file entry is obtained from an indirect entry of the file entry (root). This indirect entry is described further in detail below.

(S504) Following a control program stored internally as file structure reproducing means 214, system controller 201 instructs the optical disc drive 205 to read the root directory file from the file structure/file area using the address information for the root directory file registered in the file entry for the root directory file detected as the latest chaining information in step (S502) or (S503). The optical disc drive 205 then accesses the file structure/file area and reads the latest root directory file, and transfers it to the file structure memory 232 of memory circuit 202. For example, in a data storage medium having a data structure as shown in FIG. 4 after the formatting process, root directory file 150 is transferred. In a data storage medium having a data structure as shown in FIG. 6 after recording data file (File-a) and data file (File-b), root directory file 158 is transferred.

When this root directory file reproduction operation is completed, the optical disc drive 205 notifies the system controller 201 that the recording operation has ended. It should be noted that when adding a file under a specific directory, subdirectories are sequentially accessed from the root directory file in this step to read a specific directory file, directory files from the root directory file to a specific directory are temporarily stored to file memory 235, and the file entry that is the management information for these directories is stored to file structure memory 232.

(S505) Following a control program stored internally as file reproducing means 216, the system controller 201 reads data file (File-a) to be recorded to the data storage medium from magnetic disc drive 204, and transfers it to file memory 235 of memory circuit 202. In addition, the system controller 201 generates a directory file (Dir-A) for managing data file (File-a) according to the ISO 13346 standard. In addition, system controller 201 generates file entry (File-a) and file entry (Dir-A) for managing these files, and updates the content of the root directory file read to file structure memory 232 in step (S504). When the data to be recorded to file structure/file area 119 is thus generated, system controller 201 instructs the optical disc drive 205 to record the file entry generated in file structure memory 232 and the directory file/data file generated in file memory 235 according to a control program stored internally as file structure recording means 213 and file recording means 215.

The system controller 201 specifies the start address of the file structure and file recording area 119 in this record command. The address information specified here is obtained from the latest unallocated space entry detected in step (S502). The optical disc drive 205 internally generates recording data having a predefined link block/run-in block and link block/run-out block added before and after file structure/file data comprising the file entry transferred from file structure memory 232 and the directory file/data file transferred from file memory 235, and records continuously from the link block of link extent 118.

When this file structure/file data recording operation ends, the optical disc drive 205 notifies the system controller 201 that recording is completed. When the above-described data recording operation is completed, data file (File-a) 151 and file entry 152 for managing it, file entry 153 for managing directory file (Dir-A), and root directory 154 are formed in file structure/file area 119 as shown in FIG. 6. It should be noted that the directory file is not shown in the present embodiment because directory file (Dir-A) is recorded embedded in the file entry for managing the directory.

(S506) Following a control program stored internally as address calculation and registration means 222, the system controller 201 next calculates the address information of the unrecorded area at the most outside circumference and the location of the updated unallocated chaining information area (unrecorded area), and registers this address information as part of the chaining information in chaining information memory 234 of memory circuit 202. The unrecorded area at the most outside circumference is the area where the next file structure/file is recorded, and when a next file is written the address information of this unallocated chaining information area (unrecorded area) is registered in the indirect entry of the latest chaining information ICB as an allocated chaining information area.

(S507) Following a control program stored internally as chaining information recording means 219, the system controller 201 temporarily stores chaining information to chaining information memory 234. At this time the address information for the root directory file temporarily stored in step (S505) and address information for the next chaining information, or address information for the next file structure/file area calculated in step (S506) and address information for the updated unallocated chaining information area (unrecorded area), are included in the stored information. Next, the system controller 201 instructs the optical disc drive 205 to record the chaining information generated in chaining information memory 234. In this recording operation command, the system controller 201 internally generates recording data having a predefined link block/run-in block and link block/run-out block added before and after the chaining information from the address specified by indirect entry 411 for the unallocated space entry in the chaining information recorded in step (S305), and records continuously from link extent 110.

(S508) To write a new data file (File-b), system controller 201 follows the same control procedure as described in step (S505) to read the data file (File-b) and file structure to be recorded to the data storage medium from magnetic disc drive 204, and records to file structure/file area 121. When this file recording operation ends, data file (File-b) 155 and file entry 156 for managing it, file entry 157 for managing directory file (Dir-B), and root directory file 158, are formed in file structure/file area 121.

(S509) Next, following the same control procedure as in step (S506), system controller 201 calculates address information for unrecorded area 622 at the most outside circumference and address information for the updated unallocated chaining information area (unrecorded area), and registers it in chaining information memory 234 of memory circuit 202 as part of the chaining information. Because the entire recordable area of the contiguous chaining information area reserved during the formatting process is already allocated in the present embodiment, there is no information to be registered as unallocated chaining information area. Therefore, the address information registered in chaining information memory 234 is only the address information for the unrecorded area 622 at the most outside circumference.

(S510) Following the same control procedure as in step (S507), the system controller 201 temporarily stores chaining information in the chaining information memory 234. At this time address information for the root directory file temporarily stored in step (S508) and address information for the next chaining information, or the location of the next file structure/file area calculated in step (S509), are stored with this information, and recording data with a predefined link block/run-in block and link block/run-out block added before and after the chaining information is internally generated from the address specified by indirect entry 602 of the unallocated space entry of the chaining information recorded in step (S507) and recorded continuously from link extent 112.

Figure 6:
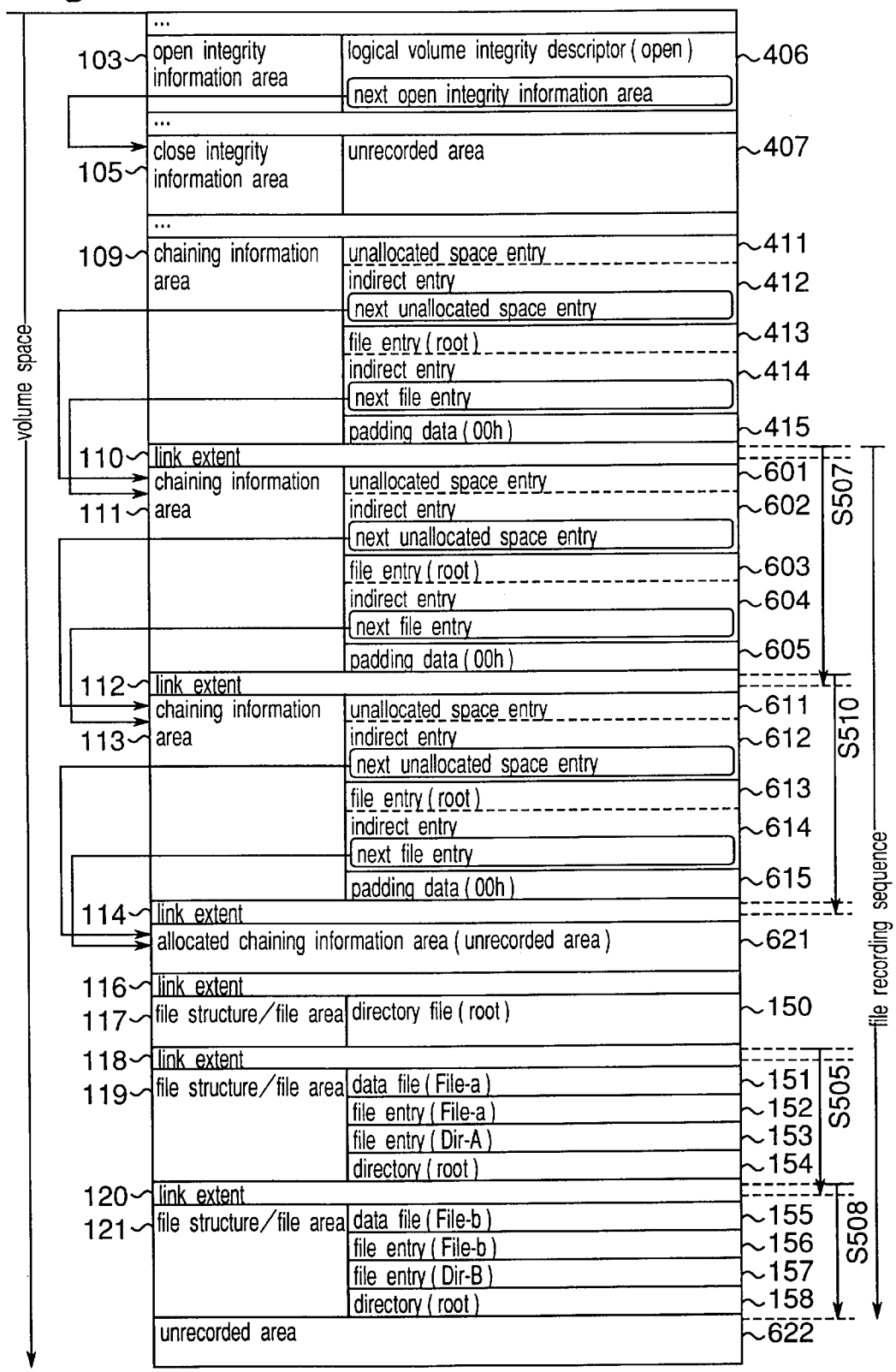
FIG. 6 is a data structure diagram of a data storage medium after the closing process is completed.

When a file recording sequence as described above is accomplished, a data structure as shown in FIG. 6 is formed on the data storage medium. It should be noted that arrows (S507) to (S510) shown in FIG. 6 indicate the areas recorded by the corresponding steps in FIG. 5.

It should be noted that while the data file, directory file, and file entries for managing these are described as being recorded at once in step (S505) and step (S508), these can be individually recorded as individual files and file entries. When these are individually recorded, a link block/run-in block and run-out block/link block are formed before and after each file or file entry. Furthermore, the recording positions of any data file, directory file, and file entry for managing these recorded in the file structure/file area are logically managed by the file structure, and the recording sequence of the data file, directory file, and file entry for managing these shall not be limited to the that shown in the data structure diagram in FIG. 6.

It should be noted that data reliability can be improved by re-reading recorded data, including the file structure, after recording a file, and then recording the file once again if the data cannot be reproduced.

It should be further noted that the file recording sequence for data file (File-a) in step (S505), and the file recording sequence for data file (File-b) in step (S508), can be performed on different recording devices.

It should be noted that in the present embodiment disc areas are allocated so that recording chaining information for two recording operations outside of the formatting process is possible, and chaining information for precisely two recording operations, that is, recording data file (File-a) and recording data file (File-b), is recorded. However, if it is desirable to write a further file before running the closing process, the continuous recording area for chaining information can be allocated again using the chaining information used for the closing process in the present invention. In this case, address information for the latest root directory 158 is recorded in the file entry of the root directory for the chaining information, and the address information immediately after the area that is re-reserved for continuously recording the chaining information, and the address information of the unallocated chaining information area that is unallocated in the contiguous area reserved for chaining information are recorded in unallocated space entry. It should be noted that reserving an area for contiguously recording chaining information according to the number of file recording operations can be accomplished once or plural times.

Figure 7:
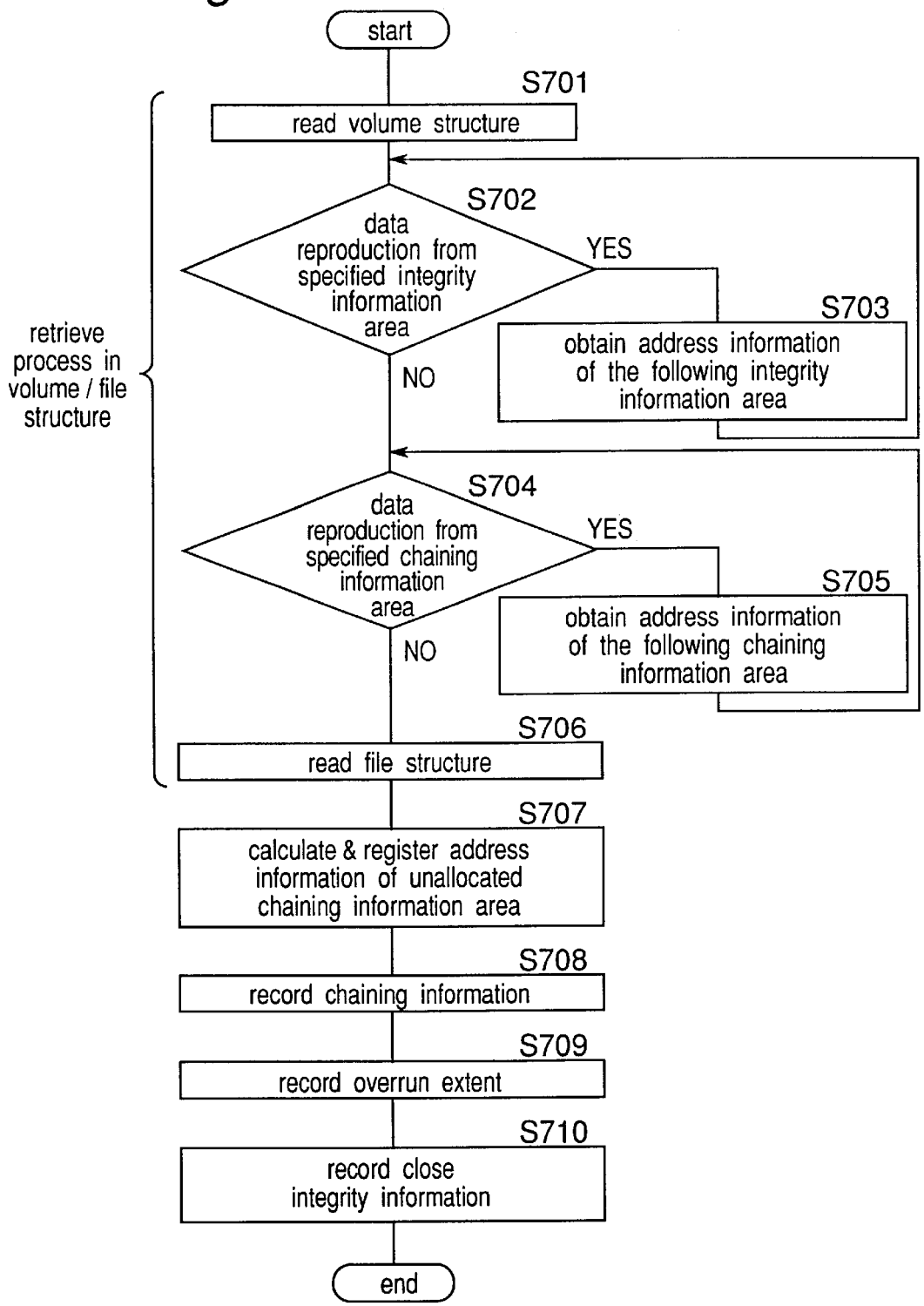
FIG. 7 is a flow chart describing a closing process of a data recording and reproducing apparatus according to the present invention.

A control procedure for a closing process for a data storage medium according to the present invention is described next with reference to the block diagram in FIG. 2, the diagram shown in FIG. 6 of the data structure after the file recording process, the flow chart of this closing process shown in FIG. 7, and the diagram shown in FIG. 8 of the data structure after the closing process.

(S701) As in step (S501) of the file recording operation described above, the system controller 201 interprets the volume structure read from volume structure area 101 or 107 to obtain the address informtion of the logical volume integrity descriptor recorded to open integrity information area 103, that is, the first integrity information, and the address information of the unallocated space entry and root directory file file entry recorded to chaining information area 109, that is, the first chaining information.

(S702) Following a control program stored internally as integrity information reproducing means 218, system controller 201 instructs reproducing the integrity information area using the address information obtained in step (S701) or the following (S703). The optical disc drive 205 accesses the specified integrity information area and attempts data reproduction. If data is reproduced from the specified integrity information area, the optical disc drive 205 transfers the reproduced integrity information to the integrity information memory 233 of memory circuit 202. The system controller 201 then performs step (S703) to retrieve the updated integrity information.

If data reproduction is not possible because the specified integrity information area is in an unrecorded state, the system controller 201 performs step (S704) to retrieve the latest chaining information. For example, in a data storage medium having a data structure as shown in FIG. 6 after file recording, logical volume integrity descriptor (open) 406 recorded to open integrity information area 103 is the latest integrity information; in a data storage medium having a data structure as shown in FIG. 8 after the closing process, logical volume integrity descriptor (close) 801 recorded to close integrity information area 105 is the latest integrity information. Integrity information is further described below.

(S703) Following a control program stored internally as integrity information reproducing means 218, the system controller 201 obtains the location of the next integrity information area contained in the integrity information read in step (S702).

(S704) As in step (S502) of the file recording operation described above, the system controller 201 tries to reproduce data from the chaining information area according to the address information obtained in step (S701) or the following step (S705). If data is reproduced in this step, step (S705) is performed to retrieve the updated chaining information.

If data reproduction is not possible because the area specified by the address information is not recorded, the system controller 201 decides that the last reproduced chaining information is the latest, and operation continues from step (S706).

(S705) As in step (S503) of the above described file recording operation, the system controller 201 obtains the address of the next chaining information area from the read chaining information.

(S706) As in step (S504) of the above described file recording operation, the system controller 201 references the latest chaining information read from the chaining information area, and reads the root directory file file contained therein. For example, in FIG. 6, the data structure after file recording, address information for the root directory file is obtained from file entry 613 for the root directory file of the latest chaining information area 113, and root directory file 158 is reproduced. Next, starting from this root directory file 158, system controller 201 sequentially reads and references the content of file entry 153 for directory file (Dir-A), directory file (Dir-A) contained in this file entry, and file entry 152 for data file (File-a).

(S707) Following a control program stored internally as address calculation and registration means 222, the system controller 201 calculates the address information of the next unrecorded area at the most outside circumference using the address information obtained in step (S705), and registers this address information in chaining information memory 234. It should be noted that in the present embodiment, to enable the number of file recording operations to be specified in the opening process sequence described further below, the unallocated chaining information area (unrecorded area) is not calculated and registered in this calculation. It should be noted that the unallocated chaining information area (unrecorded area) can be calculated and registered in the closing process sequence. In this case, a contiguous area is reserved for the chaining information from the unrecorded area after the closing process, and the unallocated part of the area is temporarily stored in the chaining information memory 234 of memory circuit 202 as the unallocated chaining information area. It should be noted, however, that the number of file recording operations is simply not specified in the opening process, and this has no affect on the file recording and reproducing process.

(S708) Following the same control program as in step (S507) and (S510), the system controller 201 temporarily stores chaining information to the chaining information memory 234. The address information for the root directory file read in step (S706), and address information for the next chaining information, are stored with this information at this time, recording data having a predefined link block/run-in block and link block/run-out block added before and after the chaining information is internally generated from the address specified by indirect entry 612 for the unallocated space entry of the chaining information recorded in step (S510), and recorded continuously from link extent 114.

(S709) Following a control program stored internally as overrun extent recording means 221, system controller 201 instructs the optical disc drive 205 to record the overrun extent. Overrun extent 122 is comprised by recording a plurality of overrun blocks. An overrun extent is formed by the optical disc drive 205 plurally recording, with consideration for the recording size of open integrity information area 821 and close integrity information area 822, an area comprising a run-out block/overrun block/link block/run-in block before and after each overrun block. An overrun extent is thus formed by recording an overrun block to an area located before and after an unrecorded area allocated for updating chaining information, close integrity information, and open integrity information. When the overrun extent recording operation ends, the optical disc drive 205 notifies the system controller 201 that the recording operation is completed.

(S710) Following a control program stored internally as integrity information recording means 217, system controller 201 temporarily stores close integrity information to the integrity information memory 233. Next, system controller 201 instructs the optical disc drive 205 to record the close integrity information stored in integrity information memory 233. In this recording operation command, system controller 201 internally generates, from the address of the next integrity information area specified by the latest integrity information obtained in step (S703), recording data by adding a predefined link block/run-in block and link block/run-out block before and after the close integrity information, and records logical volume integrity descriptor (close) 801 to close integrity information area 105.

Figure 8:
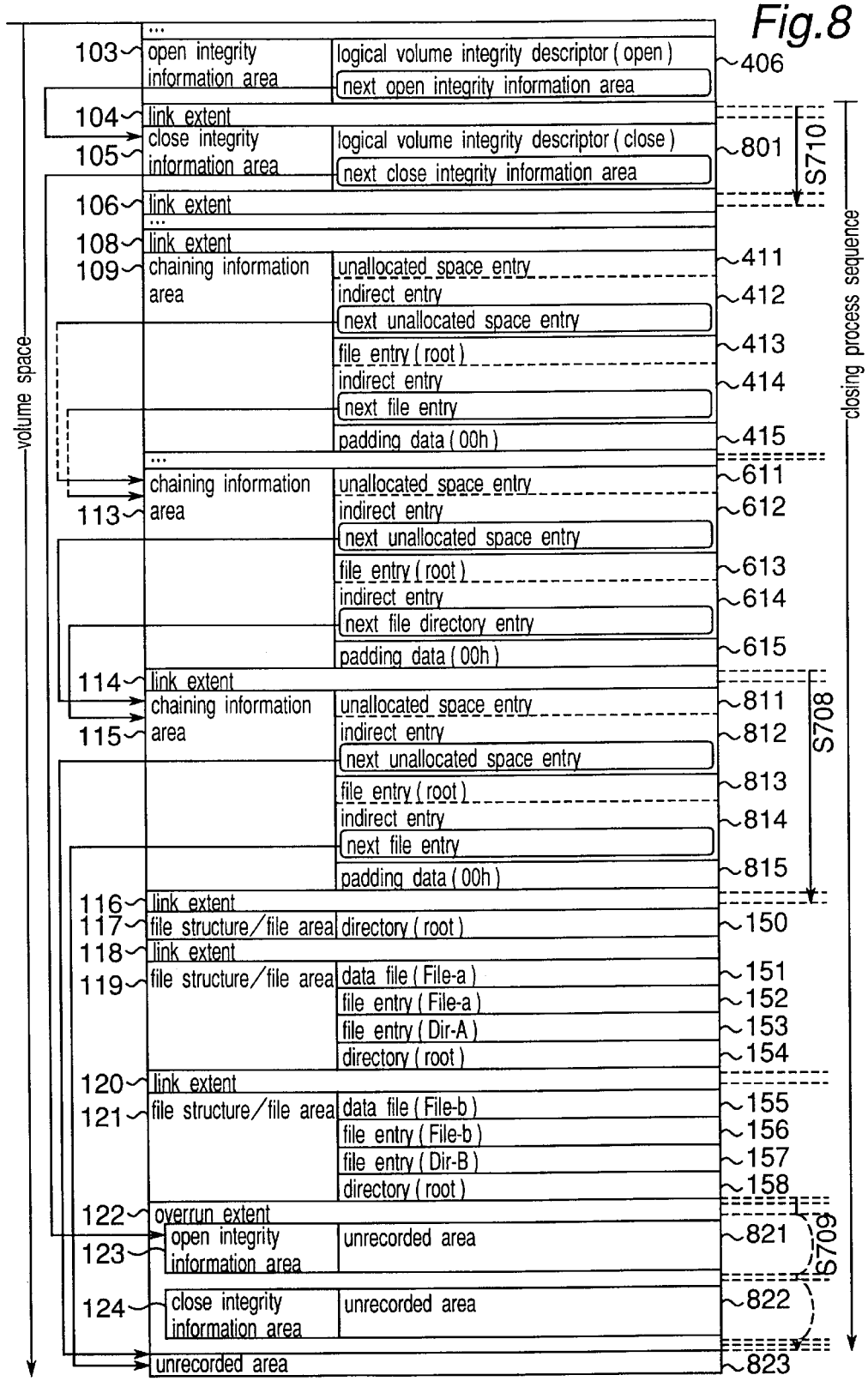
FIG. 8 is a data structure diagram of a data storage medium after the closing process is completed.

When the closing process described above is performed, a data structure as shown in FIG. 8 is formed on the data storage medium. It should be noted that arrows (S708) to (S710) shown in FIG. 8 indicate the areas recorded by the corresponding steps in FIG. 7.

It should be noted that in the present embodiment a continuous area is reserved so that recording chaining information for two recording operations outside of the formatting process is possible, and chaining information for precisely two recording operations, that is, recording data file (File-a) and recording data file (File-b), is recorded. However, if only one file has been recorded when the closing process is accomplished, file reproduction is made possible in the present invention by recording padding data, that is, dummy data (such as 00h) filling the area for chaining information that is not needed for the closing process.

The open integrity information and close integrity information used as integrity information are described next below. Open integrity information is recorded at the start of data recording, and indicates that a file can be recorded. Close integrity information is recorded when data recording is completed, and indicates that there is a match assured between the recorded file and the file management information. This integrity information assures a data match in the recording device, while at the same time providing a means whereby a read-only reproducing device without the ability to detect a disc location in an unrecorded area can determine whether all of the recorded data is reproducible, or whether data that cannot be reproduced has been further recorded since the closing process was performed.

It should be noted that considering the possibility for read errors, the logical volume integrity descriptor recorded to the integrity information area can be plurally recorded across more than one ECC block. It should be further noted that this closing process is performed when the latest integrity information is open integrity information, and it is not necessary to perform another closing process when the latest integrity information is close integrity information.

Furthermore, the overrun extent recorded in step (S709) is an area that, similarly to the lead-out area described in the prior art, is recorded to prevent an overrun into unrecorded area 131 when a read-only disc reproducing device without the ability to detect an address from an area where no data is recorded accesses area 124, which is not recorded. In addition, because unrecorded area 124 is an area of approximately several tracks with recorded areas provided therefore and thereafter, misoperation resulting from servo errors can be prevented even if a read-only disc reproducing device accesses these areas.

Figure 9:
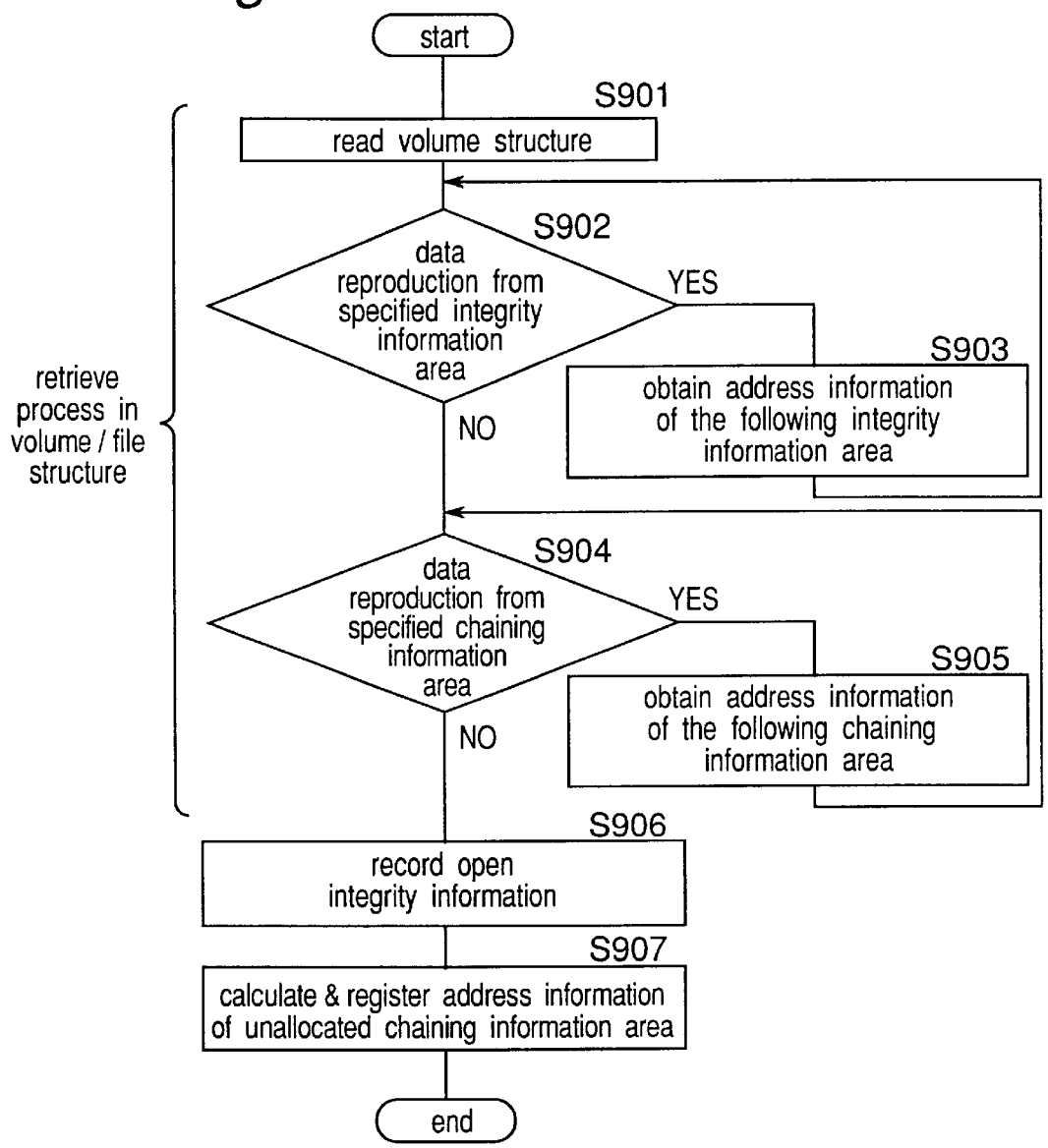
FIG. 9 is a flow chart describing a opening process of a data recording and reproducing apparatus according to the present invention.
Figure 10:
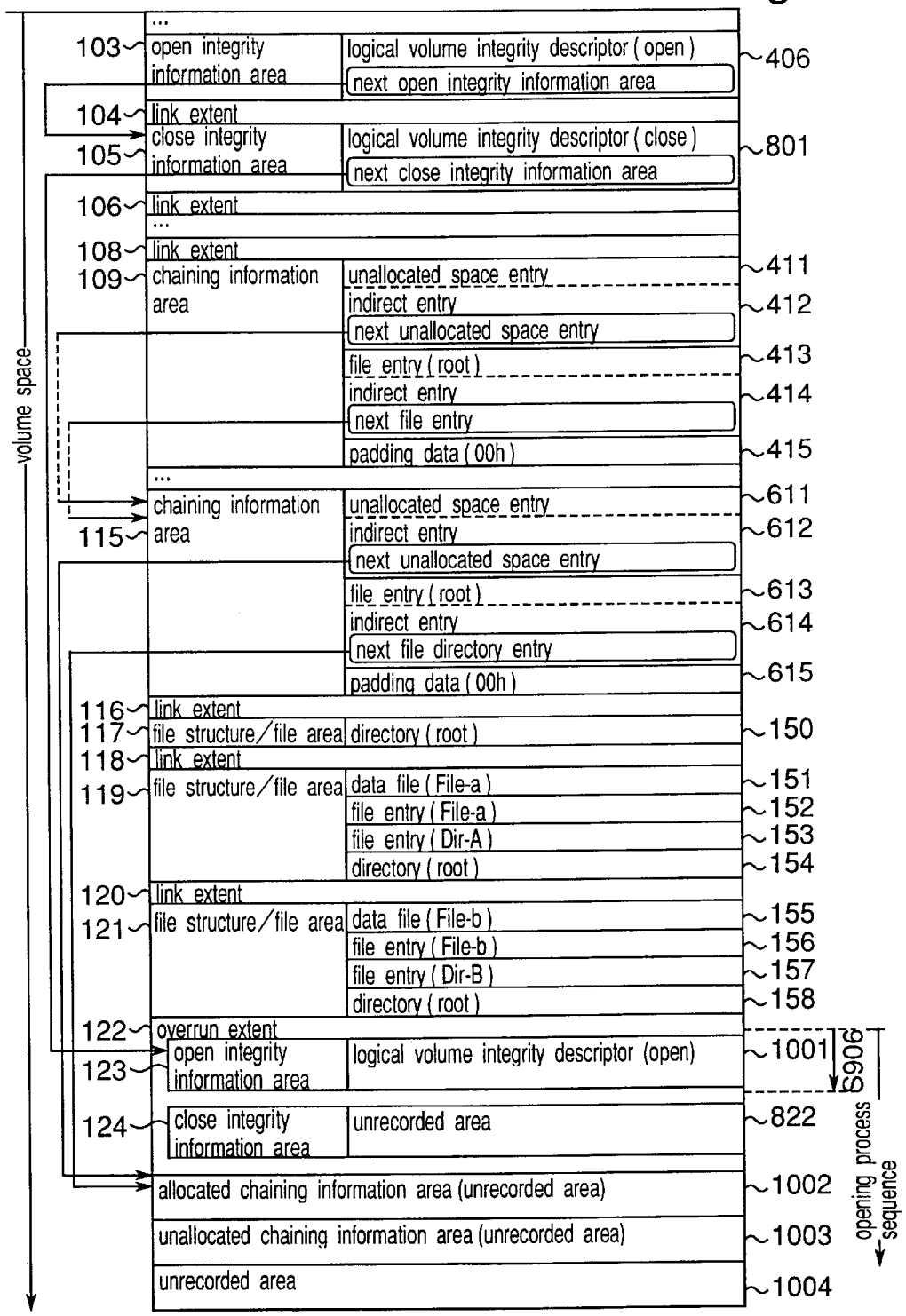
FIG. 10 is a data structure diagram of a data storage medium after the opening process.

A control procedure for a opening process to start recording to a data storage medium according to a preferred embodiment of the present invention is described next with reference to the block diagram in FIG. 2, the data structure diagram shown in FIG. 8 after the closing process, the flow chart of this opening process shown in FIG. 9, and the data structure diagram shown in FIG. 10 after this opening process.

(S901) As in step (S501) of the above described file recording operation, the system controller 201 interprets the volume structure read from the volume structure area 101 or 107, and obtains the address information of the logical volume integrity descriptor recorded to open integrity information area 103, that is, the first integrity information, and the address information of the file entry for the unallocated space entry and root directory file recorded to chaining information area 109, that is, the first chaining information.

(S902) Next, as in step (S702) of the above described closing process, the system controller 201 instructs that the integrity information area be reproduced using the address information obtained from step (S901) or the following step (S903) following a program stored internally as integrity information reproducing means 218. The optical disc drive 205 then accesses the specified integrity information area and tries to reproduce data. If data is reproduced from the specified integrity information area, the optical disc drive 205 transfers the reproduced integrity information to the integrity information memory 233 of memory circuit 202. The system controller 201 then performs step (S903) to retrieve the updated integrity information.

If data reproduction is not possible because the specified integrity information area is unrecorded, the system controller 201 performs step (S904) to retrieve the latest chaining information.

(S903) As in step (S703) of the above-described closing process, the system controller 201 obtains the address information of the next integrity information area contained in the integrity information read in step (S902) following a control program stored internally as integrity information reproducing means 218.

(S904) As in step (S502) of the above-described file recording operation, the system controller 201 attempts data reproduction from the chaining information area according to the address information obtained in step (S901) or the following (S905). If data is reproduced in this step, step (S905) is performed to retrieve the updated chaining information. However, if data reproduction is not possible because the area specified by this address information is unrecorded, system controller 201 determines that the last reproduced chaining information is the latest, and continues from step (S906).

(S905) As in step (S503) of the above-described file recording operation, the system controller 201 retrieves the address information of the next chaining information area from the read chaining information.

(S906) Following a control program stored internally as integrity information recording means 217, system controller 201 temporarily stores the open integrity information to integrity information memory 233. Next, the system controller 201 instructs the optical disc drive 205 to record the open integrity information generated in integrity information memory 233. In this recording operation command, system controller 201 internally generates, from the address of the next integrity information specified by the latest integrity information obtained in step (S903), recording data having a predefined link block/run-in block and link block/run-out block added before and after the open integrity information, and records a logical volume integrity descriptor (open) to the open integrity information area 123.

(S907) Following a control program stored internally as address calculation and registration means 222, system controller 201, using the address information obtained in step (S905), calculates the location of unrecorded area 1004 and unallocated chaining information area (unrecorded area)

1003 from the number and length of chaining information recorded to a continuous area matching the number of file recording operations, and registers this as part of the chaining information. The next possible recording start address information is calculated, and temporarily stored to chaining information memory 234 of memory circuit 202. It should be noted that address information calculated in this step is not registered in the allocation descriptor of the unallocated space entry. The next time a file is recorded, this address information is recalculated, and recorded as the unallocated space entry part of the chaining information.

When another new data file (File-c) is written under the directory structure shown in FIG. 15 using the same file recording operation described with reference to FIG. 5 to a data storage medium having a data structure as described above and shown in FIG. 10, a data structure as shown in FIG. 1 is formed on the data storage medium.

The detailed data structure of the chaining information, and more particularly the address information for unrecorded areas managed by the unallocated space entry of the chaining information, are described next in detail. The address information recorded in the chaining information is calculated in step (S303) of the formatting process shown in FIG. 3, steps (S506) and (S509) of the file recording operation process shown in FIG. 5, step (S708) of the closing process shown in FIG. 7, or step (S908) of the opening process shown in FIG. 9. In this embodiment of the invention, this calculated address information is recorded as an allocation descriptor of an unallocated space entry that is part of the chaining information. The chaining information is recorded in step (S305) of the formatting process shown in FIG. 3, steps (S507) and (S510) of the file recording operation process shown in FIG. 5, or step (S709) of the closing process shown in FIG. 7. As described with reference to step (S305), this chaining information has an ICB structure using ICB strategy 4096 defined as an implementation of ISO 13346, and comprises in this preferred embodiment of the invention an ICB for managing the root directory file, an ICB for managing unallocated space, and padding data.

Descriptor tag 181 for identifying the descriptor as an unallocated space entry, allocation descriptor 182 for managing unallocated chaining information area addresses, and allocation descriptor 183 for managing unrecorded area address information, are recorded to the unallocated space entry 171 of the unallocated space ICB. In addition, descriptor tag 184 for identifying the descriptor as an indirect entry, and address information 185 for the next recorded unallocated space entry, are recorded to the indirect entry 172 of this unallocated space ICB. In addition, descriptor tag 186 for identifying a descriptor as a file entry, and allocation tag 187 for storing the address information of the root directory file, are recorded to file entry (root) 173 of the root directory file ICB. Descriptor tag 188 for identifying a descriptor as an indirect entry, and address information 189 for the file entry (root) recorded next, are recorded to the indirect entry 174 of this root directory file ICB. Because the chaining information records the address information of the next ICB recorded in the indirect entry of these ICBs, successive chaining information can be accessed in series. When it is detected that data is not recorded at the last specified address, it is determined that chaining information should be recorded next to that area, and that the last recorded latest chaining information is the one previous chaining information.

In this preferred embodiment of the invention, address information recorded to the allocation descriptor of the latest unallocated space entry is simultaneously the file structure/file recording start address information and the address information of the area reserved for chaining information, and the address information of the root directory recorded to the allocation descriptor of the file entry for the latest root directory file simultaneously indicates that file reproduction is possible from the latest file management information. When the data storage medium uses a physical format in which data is recorded in ECC block units with error correction code added for a plurality of sectors, padding data 156 is recorded to the data storage medium after forming ECC blocks by adding padding data to valid data.

Address information for unrecorded areas that are managed by the unallocated space entry that is one characteristic of the present invention is described next. Allocation descriptor 182 for managing the unallocated chaining information area address information, and allocation descriptor 183 for managing unrecorded area address information, that are recorded to the unallocated space entry are address information for unallocated areas that are both unrecorded and not specified from any information; in the future, chaining information will be recorded to the unallocated chaining information area managed by allocation descriptor 182, and a file structure/file or overrun extent will be recorded to the unrecorded area managed by allocation descriptor 183. It should be noted that the allocation descriptors recorded to the unallocated space entry shall not be limited to these two types.

An area to which continuous chaining information matching the number of file write operations can be recorded is assured in the formatting process and opening process of the present invention. This area is broadly categorized as one of three areas: an area to which chaining information is recorded, an allocated chaining information area that is already allocated for recording the next chaining information by the indirect entry that is the previous chaining information ICB, or an unallocated chaining information area that is both unallocated and unrecorded and is neither of the above two areas. The address information of this unallocated chaining information area is recorded in the allocation descriptor of the unallocated space entry in previous chaining information. For example, in the data structure diagram after the formatting process shown in FIG. 4, address information for the allocation descriptor of unrecorded area 418 and unallocated chaining information area (unrecorded area) 417 is recorded in unallocated space entry 411. Furthermore, the address information for this unrecorded area and the unallocated chaining information area is recalculated in the file recording sequence and closing process, and the updated information is registered in the chaining information as an allocation descriptor. It should be noted that these calculations must consider the size of a link extent that may be present.

Figure 11:
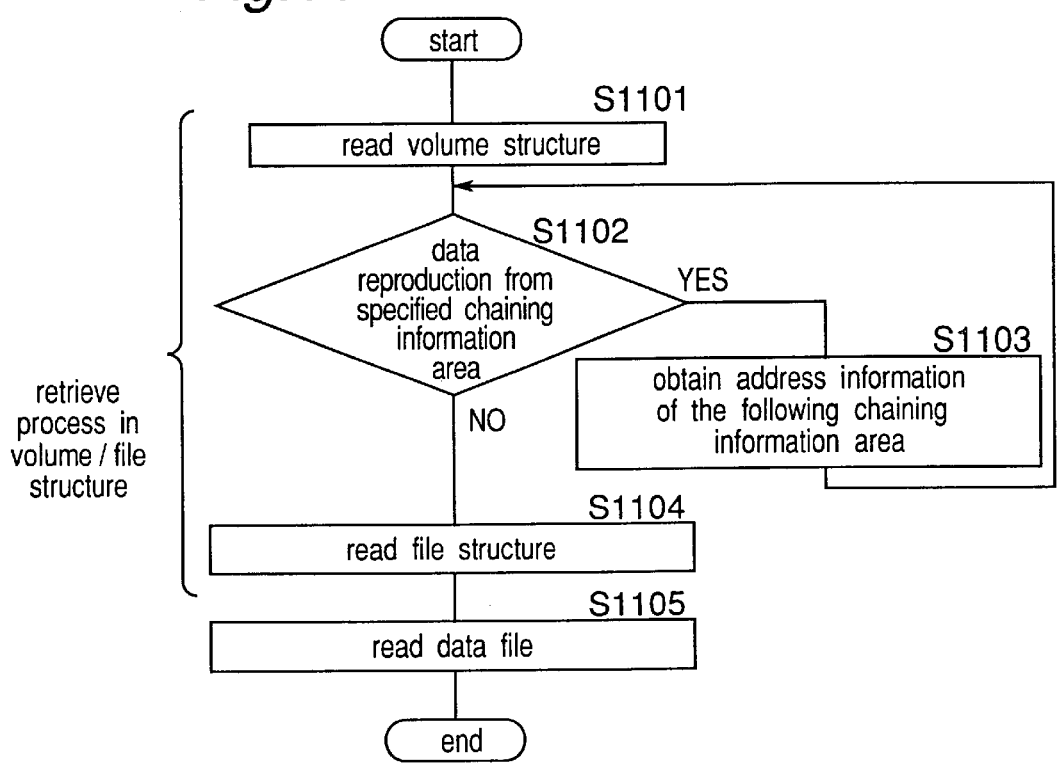
FIG. 11 is a flow chart of a file reproduction process in a data recording and reproducing apparatus according to the present invention.

The control sequence of a file reproducing process applied by a data recording and reproducing apparatus to a data storage medium according to the present invention is described next below with reference to the block diagram in FIG. 2, the flow chart in FIG. 11 of the file reproducing process, and the data structure diagram shown in FIG. 1. It should be noted that data file (File-a) managed using the directory structure shown in FIG. 15 is reproduced in this file recording process.

(S1101) As in step (S501) of the above described file recording operation, the system controller 201 interprets the volume structure read from the volume structure area 101 or 107, and obtains the address information of the logical volume integrity descriptor recorded to open integrity information area 103, that is, the first integrity information, and the address information of the file entry for the unallocated space entry and root directory file recorded to chaining information area 109, that is, the first chaining information.

(S1102) As in step (S502) of the file recording operation described above, following a control program stored internally as chaining information reproducing means 220, the system controller 201 tries to reproduce data from each chaining information area recorded to a continuous area using the address information obtained in step (S501) or the following step (S503). If data is reproduced from the specified chaining information area, step (S1103) is performed to search the updated chaining information area.

If data reproduction is not possible because the specified chaining information area is not recorded, the system controller 201 decides that the last reproduced chaining information is the latest, and operation continues from step (S1104).

(S1103) As in step (S503) of the above described file recording operation, the system controller 201 obtains the address information of the next chaining information area from the read chaining information.

(S1104) As in step (S504) of the above described file recording operation, the system controller 201 references the latest chaining information read from chaining information area 125, and reads root directory file 162 according to the allocation descriptor 187 of the file entry 173 for the root directory file. Next, starting at this root directory file 162, system controller 201 sequentially reads and references the content of file entry 153 of directory file (Dir-A) and directory file (Dir-A) recorded in this file entry, and file entry 152 of data file (File-a).

(S1105) Finally, system controller 201 reads file (File-a) 151 by means of file reproducing means 216, and completes the file reproducing operation.

A file reproduction process whereby a data reproducing apparatus reads files from a data storage medium according to the present invention is described next below with reference to the block diagram in FIG. 12, the flow chart of a file reproducing process shown in FIG. 13, and the data structure diagram shown in FIG. 1. It should be noted that a data file (File-a) managed using the directory structure shown in FIG. 15 is reproduced in this file recording process.

Figure 12:
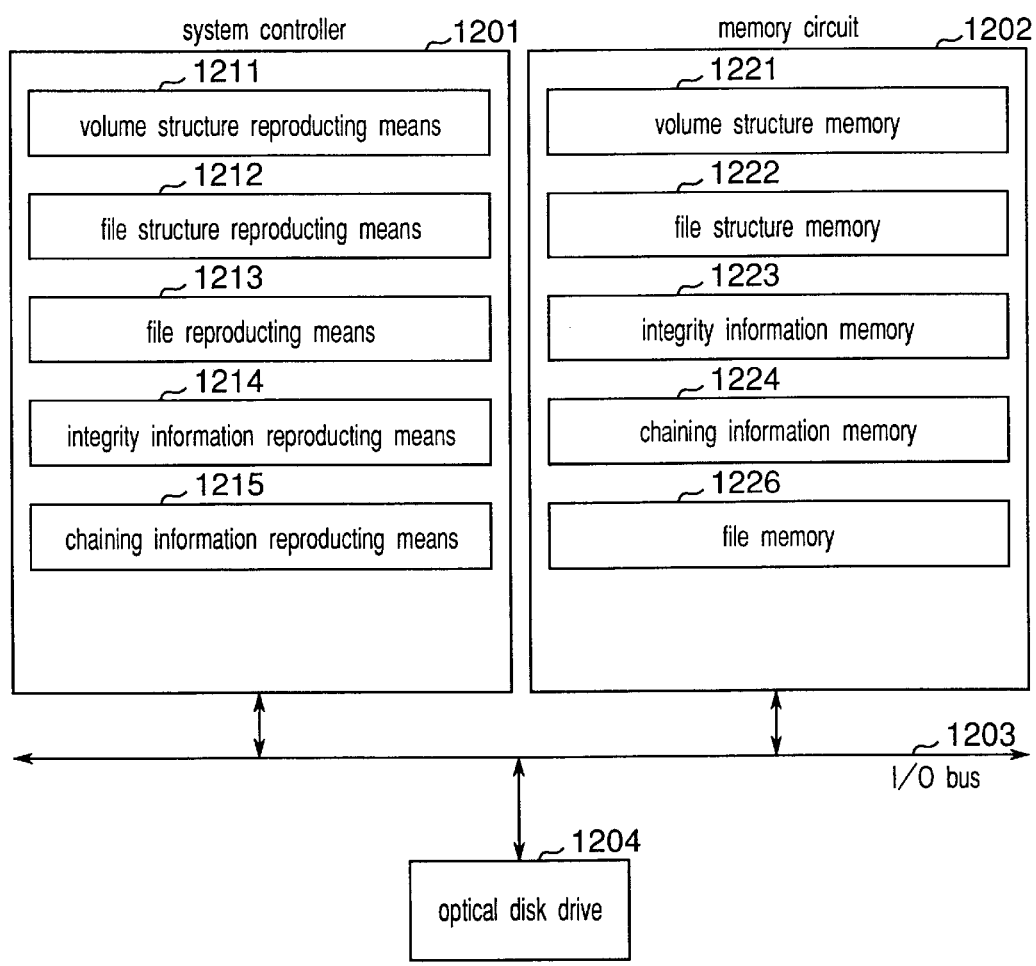
FIG. 12 is a block diagram of a read-only data reproducing apparatus according to the present invention.
Figure 13:
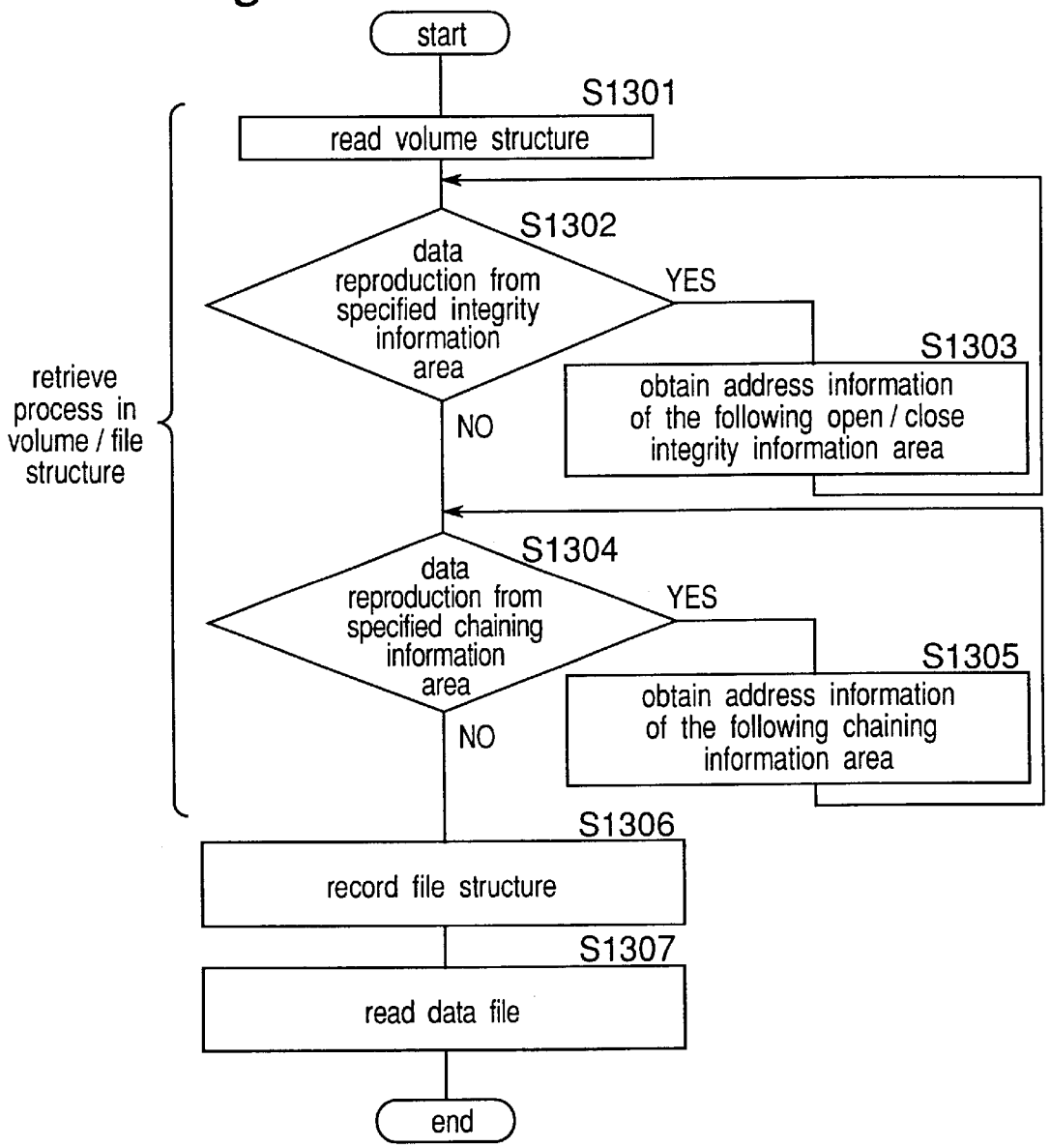
FIG. 13 is a flow chart of a file reproduction process in a data reproducing apparatus according to the present invention.
Figure 14:
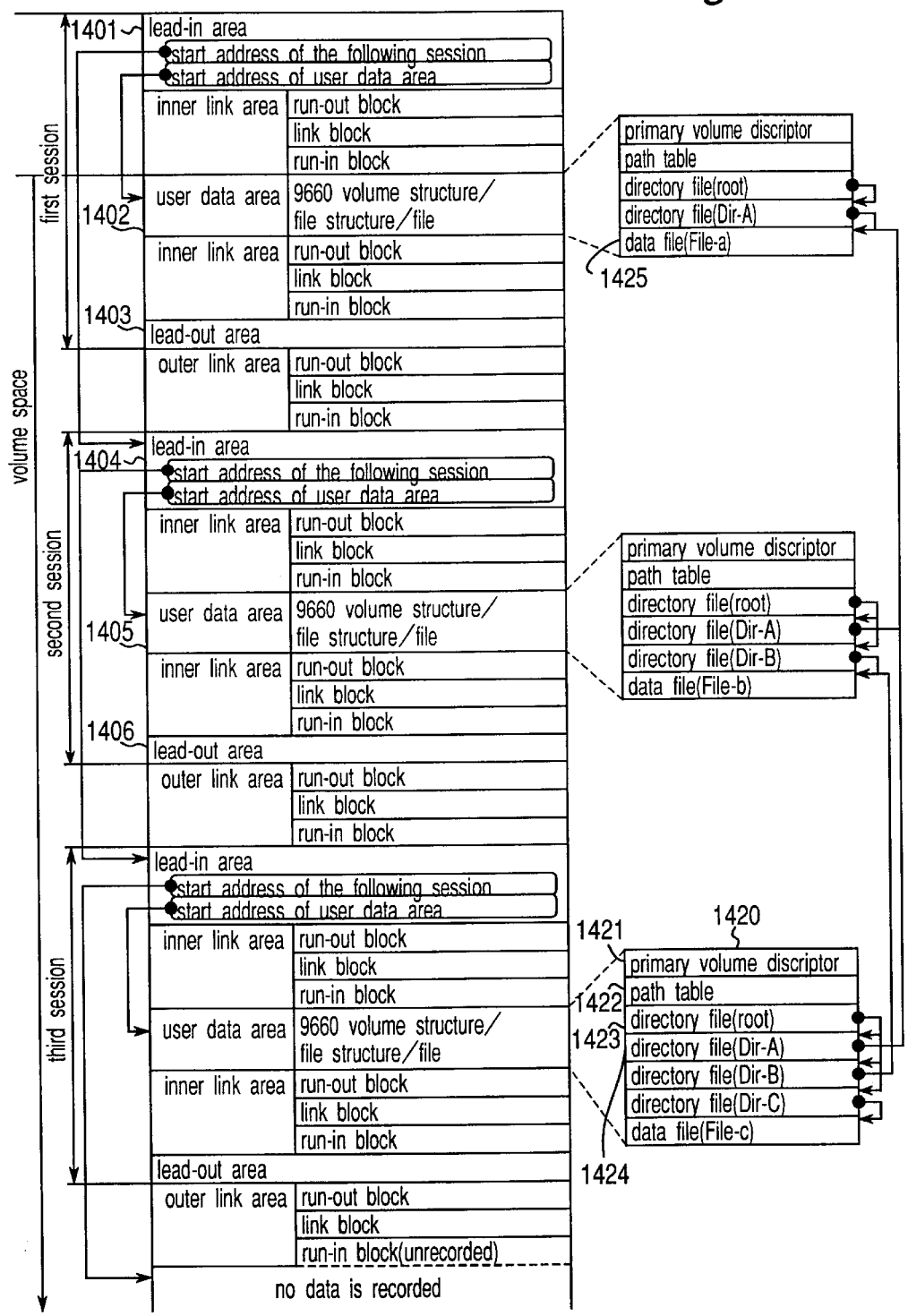
FIG. 14 is a data structure diagram of a CD-R disc recorded with a conventional multi-session method.

FIG. 12 is a block diagram of a data reproducing apparatus according to a preferred embodiment of the present invention. As shown in FIG. 12, this data reproducing apparatus comprises a system controller 1201, memory circuit 1202, I/O bus 1203, and optical disc drive 1204.

The system controller 1201, which is achieved with a control program and a microprocessor containing operating memory, comprises: volume structure reproducing means 1211 for reproducing volume structure; a file structure reproducing means 1212 for reproducing file structure; a file reproducing means 1213 for reproducing file data; a integrity information reproducing means 1214 for reproducing integrity information; and chaining information reproducing means 1215 for reproducing chaining information.

The memory circuit 1202 comprises volume structure memory 1221 used for calculating and temporarily storing volume structure; file structure memory 1222 used for calculating and temporarily storing file structure integrity information memory 1223 used for calculating and temporarily storing integrity information; chaining information memory 1224 used for calculating and temporarily storing chaining information; and file memory 1225 for temporarily storing a data file.

(S1301) As in step (S501) of the above described file recording operation, the system controller 1201 interprets the volume structure read from the volume structure area 101 or 107, and obtains the address information of the logical volume integrity descriptor recorded to open integrity information area 103, that is, the first integrity information, and the address information of the file entry for the unallocated space entry and root directory file recorded to chaining information area 109, that is, the first chaining information.

(S1302) As in step (S702) of the above described file recording operation, the system controller 1201 attempts data reproduction from the integrity information area according to the address information obtained from step (S1301) or the following step (S1303). If data is reproduced in this step, step (S1303) is performed to retrieve the updated integrity information. However, is data reproduction is not possible because the area specified by this address information is not recorded, system controller 1201 determines that the last reproduced integrity information is the latest, and proceeds from step (S1304). As noted above, each integrity information stores the address information of the next integrity information, and that address specifies the area to which integrity information is to be recorded next. If the area read from an integrity information as the area to which the next integrity information should be recorded is unrecorded, it is possible to determine that that integrity information is the latest.

It should be noted that if the integrity information determined as the latest is open integrity information, it is known that data recording is incomplete because of, for example, the disc being removed while recording was in progress; if close integrity information, a data match is verified because it is known that data recording has been completed to the current point. In this step, the disc reproducing device will not malfunction even if unrecorded area 124 for close integrity information in the overrun extent is accessed because a recorded area containing dummy data is located therebefore and thereafter. In this exemplary embodiment the latest integrity information is open integrity information. Open integrity information means that data recording stopped before recording was completed because the disc was ejected or an error occurred during recording, for example.

In a read-only disc player, a disc is read by treating the data recorded through the close integrity information preceding this open integrity information as valid data. In a disc recorder, a search utility can be used to find the end of the recorded data and thereby enable data recovery.

It should be noted that the area beyond the overrun extent where close integrity information is not recorded need not be accessed because the overrun extent to which the last file entry (root) is recorded can be determined by detecting the last close integrity information. It is therefore possible to efficiently detect the last file entry (root) because the location of the last overrun extent is already known when looking for the last file entry (root).

(S1303) As in step (S703) of the above described closing process, the system controller 1201 obtains the address information of the next integrity information area from the read integrity information.

(S1304) As in step (S502) of the above described file recording operation, system controller 1201 attempts to read data from each chaining information area recorded to a continuous area according to the address information obtained in step (S1301) or the following step (S1305). If data is reproduced in this step, step (S1305) is performed to retrieve the updated chaining information. However, if data reproduction is not possible because the area specified by this address information is unrecorded, system controller 1201 determines the last reproduced chaining information to be the latest, and proceeds from step (S1306).

(S1305) As in step (S503) of the above described file recording operation, system controller 1201 obtains the address information of the next chaining information area from the read chaining information.

(S1306) As in step (S1306) of the above described file recording operation, system controller 1201 references the latest chaining information read from chaining information area 115, and reads root directory file 158 according to the allocation descriptor of file entry 813 for the root directory file contained therein. Next, starting from this root directory file 158, system controller 1201 sequentially reads and references the content of directory file (Dir-A) file entry 153 and the directory file (Dir-A) recorded in this file entry, and data file (File-a) file entry 152.

(S1307) Finally, system controller 1201 reads data file (File-a) 141 by means of file reproducing means 1216, and completes the file reproducing operation.

The search operation of the latest chaining information carried out in the reproducing operation in the disc recording or disc reproducing apparatus is being done by repeating the sequence operation of obtaining and reading, from the volume structure, the address information of the chaining information which appears after the first recorded chaining information. Since the pieces of chaining information, which are to be read out in the chain, are stored in areas sequentially continued, the driver unit may need not to seek the head for access purpose, but able to read a plurality of pieces of chaining information recorded in that areas, resulting in fast access. Also, the search operation of the latest chaining information may be done not only during the file reproducing operation, but also during the file recording operation.

It should be noted that a file structure that is accessible from the last file entry is assured of having a structure that is a complete file structure. It will therefore be obvious that on a specific read-only disc drive a specific file can be read by retrieving only the file entry without retrieving integrity information.

It should be noted that an overrun extent is an area added before and after a unrecorded area where dummy data is accessed so that servo errors do not occur if the drive accesses a unrecorded disc area, and the overrun extent only needs to be large enough to achieve this objective.

It should be noted that when an area that should be recorded in an overrun extent is determined to be unrecorded, the immediately preceding chaining information and integrity information is determined to be the latest, but this shall not be limited to detection of an unrecorded area. It will be obvious that the above described file recording operation is performed in the same way for data file (File-b) and data file (File-c). It is possible with this type of file reproducing operation to retrieve and reproduce all data files using only the volume structure and file structure recorded in the volume space. A special command for reading TOC data, which is a type of file retrieval information, from the lead-in area as described in the prior art is therefore not necessary, and all files can be reproduced using only the READ command used for data reproduction operations in the volume space.

It should be noted that compatibility with existing file systems is high because reading is possible using the file system of conventional read-only disc drives once the latest root directory file is found.

It is thus possible to reproduce the volume/file structure and files using only data in the volume space by thus using chaining information to manage file and file structure update information and specify the next possible recording start address. It is therefore not necessary read from a physical area using a special command, and recording and reproducing operations can be accomplished using only normal READ and WRITE commands.

Furthermore, recording open and close integrity information makes it possible to assure data match integrity and to recover data in the event an error occurs during recording.

Furthermore, recording the above noted chaining information and integrity information in an overrun extent enables the latest chaining information and integrity information to be retrieved while at the same time enabling the recording start position for new data to be detected without entering an unrecorded area.

Furthermore, sequentially recording this chaining information to a contiguous area enables high speed access by reading this chaining information in series.

Furthermore, recording compatibility between disc recorders can be achieved by recording address information for the unallocated and unrecorded part of this contiguous chaining information area.

What is claimed is:

1. A data storage medium in which a file managed using a volume/file structure is recorded and reproduced from one end of a data recording area, and in which a number of data recording operations to a same area is limited, comprising:
an area for continuously recording a plurality of chaining information areas to which is recorded chaining information containing root directory file management information having location information for a next root directory file allocated for update recording, and unallocated area management information having location information for a next unrecorded area.

2. A data storage medium as described in claim 1, wherein said area for continuously recording a plurality of said chaining information areas is located immediately following an overrun extent first recorded for recording an overrun block for preventing a performance drop as a result of wrong access to an unrecorded area.

3. A data storage medium as described in claim 1, wherein said chaining information stores address information for an unallocated chaining information area that has not been allocated in the area where a chaining information area is continuously recorded.

4. A data storage medium as described in claim 3, wherein said unallocated chaining information area address information is recorded as an allocation descriptor of an unallocated space entry that is part of the chaining information.

5. A data recording method for applying a formatting process to a data storage medium in which a file managed using a volume/file structure is recorded and reproduced from one end of a data recording area, and in which a number of data recording operations to a same area is limited, comprising:
a volume structure recording step for recording volume structure;
an open integrity information recording step for recording open integrity information indicating a formatting process start status;
an unallocated chaining information area address calculation and registration step for calculating and registering in chaining information an address of an unallocated chaining information area that is an unallocated area in an area where chaining information is continuously recorded;

a root directory file recording step for recording a root directory file; and a chaining information recording step for recording chaining information.

6. A data recording method as described in claim 5, wherein in the unallocated chaining information area address calculation and registration step the unallocated chaining information area address information is registered as an allocation descriptor for an unallocated space entry of the chaining information.

7. A data recording apparatus for applying a formatting process to a data storage medium in which a file managed using a volume/file structure is recorded and reproduced from one end of a data recording area, and in which a number of data recording operations to a same area is limited, comprising:

a volume structure recording means for recording volume structure;

an open integrity information recording means for recording open integrity information indicating a formatting process start status;

an address calculation and registration means for calculating and registering in chaining information an address of an unallocated chaining information area that is an unallocated area in an area where chaining information is continuously recorded;

a file structure recording means for recording a root directory file; and a chaining information recording means for recording chaining information.

8. The data recording apparatus as described in claim 7, wherein in the unallocated chaining information area address calculation and registration means the unallocated chaining information area address information is registered as an allocation descriptor for an unallocated space entry of the chaining information.

9. A data recording method for recording a file to a data storage medium in which a file managed using a volume/file structure is recorded and reproduced from one end of a data recording area, and in which a number of data recording operations to a same area is limited, comprising:

a volume structure reproducing step for reading volume structure recorded in a formatting process;

a chaining information reproducing step for reading the latest chaining information while reading in series completely recorded chaining information according to previously read volume structure content;

a file structure reproducing step for reading a file structure;

a file recording step for accomplishing data file recording;

a file structure recording step for accomplishing file structure recording;

an address calculation and registration step for calculating and registering in chaining information an address information of an unallocated chaining information area that is an unallocated area in an area where a plurality of chaining information is continuously recorded; and a chaining information recording step for recording chaining information.

10. A data recording method as described in claim 9, wherein in the unallocated chaining information area address calculation and registration step the unallocated chaining information area address information is registered as an allocation descriptor for an unallocated space entry of the chaining information.

11. A data recording method as described in claim 9, wherein when the area where chaining information is continuously recorded is insufficient for a number of file write operations, the unallocated chaining information area address calculation and registration step calculates and re-reserves an address of an area where chaining information is continuously recorded.

12. A data recording apparatus for recording a file to a data storage medium in which a file managed using a volume/file structure is recorded and reproduced from one end of a data recording area, and in which a number of data recording operations to a same area is limited, comprising:

a volume structure reproducing means for reading volume structure recorded in a formatting process;

a chaining information reproducing means for reading the latest chaining information while reading in series completely recorded chaining information according to previously read volume structure content;

a file structure reproducing means for reading a file structure;

a file recording means for accomplishing data file recording;

a file structure recording means for accomplishing file structure recording;

an address calculation and registration means for calculating and registering in chaining information an address infornmation of an unallocated chaining information area that is an unallocated area in an area where a plurality of chaining information is continuously recorded; and a chaining information recording for recording chaining information.

13. A data recording apparatus as described in claim 12, wherein in the unallocated chaining information area address calculation and registration means the unallocated chaining information area address information is registered as an allocation descriptor for an unallocated space entry of the chaining information.

14. A data recording apparatus as described in claim 13, wherein when the area where chaining information is continuously recorded is insufficient for a number of file write operations, the unallocated chaining information area address calculation and registration means calculates and re-reserves an address of an area where chaining information is continuously recorded.

15. A data recording method for applying a closing process, for preventing a performance drop resulting from wrong access to an unrecorded area, to a data storage medium in which a file managed using a volume/file structure is recorded and reproduced from one end of a data recording area, and in which a number of data recording operations to a same area is limited, comprising:

a volume structure reproducing step for reading volume structure recorded in a formatting process;

an integrity information reproducing step for reading the latest integrity information while reading in series completely recorded close integrity information and open integrity information according to previously read volume structure content;

a chaining information reproducing step for reading the latest chaining information while reading in series completely recorded chaining information according to previously read volume structure content;

a file structure reproducing step for reading a file structure using the read chaining information;

an unallocated chaining information area address calculation and registration step for calculating and registering in chaining information an address of an unallocated chaining information area that is an unallocated area in an area where chaining information is continuously recorded;

a chaining information recording step for recording chaining information;

an overrun extent recording step for recording an overrun extent for preventing wrong access to an unrecorded area in a file structure and file reproducing operation; and a close integrity information recording step for recording close integrity information indicative of recording completion.

16. A data recording method as described in claim 15, wherein the chaining information recording step is characterized by recording with padding data, which is dummy data filling an unrecorded area of the area in which chaining information is continuously recorded.

17. A data recording method as described in claim 15, wherein the unallocated chaining information area address calculation and registration step calculates and records in chaining information address information of an area where chaining information recorded at a next file recording is continuously recorded.

18. A data recording apparatus for applying a closing process, for preventing a performance drop resulting from wrong access to an unrecorded area, to a data storage medium in which a file managed using a volume/file structure is recorded and reproduced from one end of a data recording area, and in which a number of data recording operations to a same area is limited, comprising:

a volume structure reproducing means for reading volume structure recorded in a formatting process;

an integrity information reproducing means for reading the latest integrity information while reading in series completely recorded close integrity information and open integrity information according to previously read volume structure content;

a chaining information reproducing means for reading the latest chaining information while reading in series completely recorded chaining information according to previously read volume structure content;

a file structure reproducing means for reading a file structure using the read chaining information;

an unallocated chaining information area address calculation and registration means for calculating and registering in chaining information an address of an unallocated chaining information area that is an unallocated area in an area where chaining information is continuously recorded;

a chaining information recording means for recording chaining information;

an overrun extent recording means for recording an overrun extent for preventing wrong access to an unrecorded area in a file structure and file reproducing operation; and a close integrity information recording means for recording close integrity information indicative of recording completion.

19. A data recording apparatus as described in claim 18, wherein unallocated chaining information area address calculation and registration means calculates and records in chaining information address information of an area where chaining information recorded at a next file recording is continuously recorded.

20. A data recording apparatus as described in claim 18, wherein the chaining information recording means is characterized by recording with padding data, which is dummy data filling an unrecorded area of the area in which chaining information is continuously recorded.

21. A data recording method for applying a opening process for beginning recording data to a data storage medium in which a file managed using a volume/file structure is recorded and reproduced from one end of a data recording area, and in which a number of data recording operations to a same area is limited, comprising:

a volume structure reproducing step for reading volume structure recorded in a formatting process;

an integrity information reproducing step for reading the latest integrity information while reading in series completely recorded close integrity information and open integrity information according to previously read volume structure content;

a chaining information reproducing step for reading the latest chaining information while reading in series completely recorded chaining information according to previously read volume structure content;

an open integrity information recording step for recording open integrity information; and an unallocated chaining information area address calculation and registration step for calculating and registering in chaining information an address of an unallocated chaining information area that is an unallocated area in an area where chaining information is continuously recorded.

22. A data recording method as described in claim 21, wherein the address information calculated in the unallocated chaining information area address calculation and registration step is an allocation descriptor for an unallocated space entry of the chaining information.

23. A data recording apparatus for applying a closing process, for preventing a performance drop resulting from wrong access to an unrecorded area, to a data storage medium in which a file managed using a volume/file structure is recorded and reproduced from one end of a data recording area, and in which a number of data recording operations to a same area is limited, comprising:

a volume structure reproducing means for reading volume structure recorded in a formatting process;

an integrity information reproducing means for reading the latest integrity information while reading in series completely recorded close integrity information and open integrity information according to previously read volume structure content;

a chaining information reproducing means for reading the latest chaining information while reading in series completely recorded chaining information according to previously read volume structure content;

an open integrity information recording means for recording open integrity information; and an unallocated chaining information area address calculation and registration means for calculating and registering in chaining information an address of an unallocated chaining information area that is an unallocated area in an area where chaining information is continuously recorded.

24. A data recording apparatus as described in claim 23, wherein the address information calculated in the unallocated chaining information area address calculation and registration means is an allocation descriptor for an unallocated space entry of the chaining information.

25. A data reproducing method for reproducing a file from a data storage medium to which a volume/file structure is recorded by a formatting process and to which a number of data recording operations to a same area is limited, comprising:
- a volume structure reproducing step for reading volume structure recorded in a formatting process;
- a chaining information reproducing step for reading the latest chaining information while reading in series a plurality of continuously recorded chaining information according to previously read volume structure content;
- a file structure reproducing step for reading file structure using the read chaining information; and
- a file reproducing step for retrieving and reading a file using the read file structure.

26. A data reproducing method as described in claim 25, further comprising an integrity information reproducing step for reading the latest close integrity information while reading in series close integrity information and open integrity information according to previously read volume structure content.

27. A data reproducing apparatus for reproducing a file from a data storage medium to which a volume/file structure is recorded by a formatting process and to which a number of data recording operations to a same area is limited, comprising:
- a volume structure reproducing means for reading volume structure recorded in a formatting process;
- a chaining information reproducing means for reading the latest chaining information while reading in series a plurality of continuously recorded chaining information according to previously read volume structure content;
- a file structure reproducing means for reading file structure using the read chaining information; and
- a file reproducing means for retrieving and reading a file using the read file structure.

* * * * *

UNITED STATES PATENT AND TRADEMARK OFFICE
CERTIFICATE OF CORRECTION

PATENT NO. : 6,785,219 B1
DATED : August 31, 2004
INVENTOR(S) : M. Sasaki et al.

It is certified that error appears in the above-identified patent and that said Letters Patent is hereby corrected as shown below:

Column 28,
Line 32, "infornmation" should be -- information --.

Signed and Sealed this

Twenty-second Day of March, 2005

JON W. DUDAS
*Director of the United States Patent and Trademark Office*